United States Patent
Wang et al.

(10) Patent No.: US 11,215,743 B2
(45) Date of Patent: Jan. 4, 2022

(54) ACHROMATIC OPTICAL DEVICE BASED ON BIREFRINGENT MATERIALS HAVING POSITIVE AND NEGATIVE BIREFRINGENCE DISPERSIONS

(71) Applicant: Facebook Technologies, LLC, Menlo Park, CA (US)

(72) Inventors: Junren Wang, Redmond, WA (US); Lu Lu, Kirkland, WA (US); Fenglin Peng, Redmond, WA (US); Mengfei Wang, Seattle, WA (US); Yun-Han Lee, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/810,714

(22) Filed: Mar. 5, 2020

(65) Prior Publication Data

US 2021/0278582 A1 Sep. 9, 2021

(51) Int. Cl.
*G02B 5/30* (2006.01)

(52) U.S. Cl.
CPC .................. *G02B 5/3016* (2013.01)

(58) Field of Classification Search
CPC .................. G02F 1/133637; G02B 5/3016
See application file for complete search history.

(56) References Cited

U.S. PATENT DOCUMENTS

| 7,480,021 | B2 | 1/2009 | Rao et al. | |
| 2009/0066886 | A1 | 3/2009 | Shimizu et al. | |
| 2014/0205822 | A1* | 7/2014 | Wang | G02B 27/28 428/216 |
| 2015/0115199 | A1* | 4/2015 | Choi | G02F 1/133784 252/299.61 |
| 2015/0293286 | A1* | 10/2015 | Jeon | G02F 1/13363 359/489.07 |
| 2016/0077352 | A1 | 3/2016 | Zhang et al. | |

OTHER PUBLICATIONS

Communication relating to the results of the partial international search and provisional opinion, dated Apr. 30, 2021, in International Application No. PCT/US2021/016242, filed on Feb. 2, 2021 (8 pages).
International Search Report and Written Opinion, dated Jun. 28, 2021, in International Application No. PCT/US2021/016242, filed on Feb. 2, 2021 (14 pages).

\* cited by examiner

*Primary Examiner* — Nathanael R Briggs
(74) *Attorney, Agent, or Firm* — Millburn IP PLLC

(57) ABSTRACT

An optical device includes a first layer including a first birefringent material having a negative birefringence dispersion property. The optical device also includes a second layer including a second birefringent material having a positive birefringence dispersion property. The first layer and the second layer are structurally patterned to provide at least one predetermined optical function.

20 Claims, 16 Drawing Sheets

US 11,215,743 B2

ACHROMATIC OPTICAL DEVICE BASED ON BIREFRINGENT MATERIALS HAVING POSITIVE AND NEGATIVE BIREFRINGENCE DISPERSIONS

TECHNICAL FIELD

The present disclosure relates generally to optical devices and, more specifically, to an achromatic optical device based on birefringent materials having positive and negative birefringence dispersions.

BACKGROUND

Consumer electronic devices with properties such as visually appealing, light-weight, colorless, and power efficient are in high demand. Accordingly, it is desirable to design optical components used in these devices such that these devices can be adaptive, optically efficient, light-weight, and broadband. Technology for reducing the weight while enhancing the optical performance of optical components in these devices has become an attractive topic for research and development.

SUMMARY

One aspect of the present disclosure provides an optical device. The optical device includes a first layer including a first birefringent material having a negative birefringence dispersion property. The optical device also includes a second layer including a second birefringent material having a positive birefringence dispersion property. The first layer and the second layer are structurally patterned to provide at least one predetermined optical function.

Another aspect of the present disclosure provides an optical device. The optical device includes a substrate. The optical device also includes a birefringent medium layer coupled to the substrate. The birefringent medium layer includes a combination of a first birefringent material having a negative birefringence dispersion property and a second birefringent material having a positive birefringence dispersion property. The birefringent medium layer is structurally patterned to provide at least one predetermined optical function.

Another aspect of the present disclosure provides an optical film. The optical film includes a birefringent medium layer including a combination of a first birefringent material having a negative birefringence dispersion property and a second birefringent material having a positive birefringence dispersion property. The birefringent medium layer is structurally patterned to provide at least one predetermined optical function.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
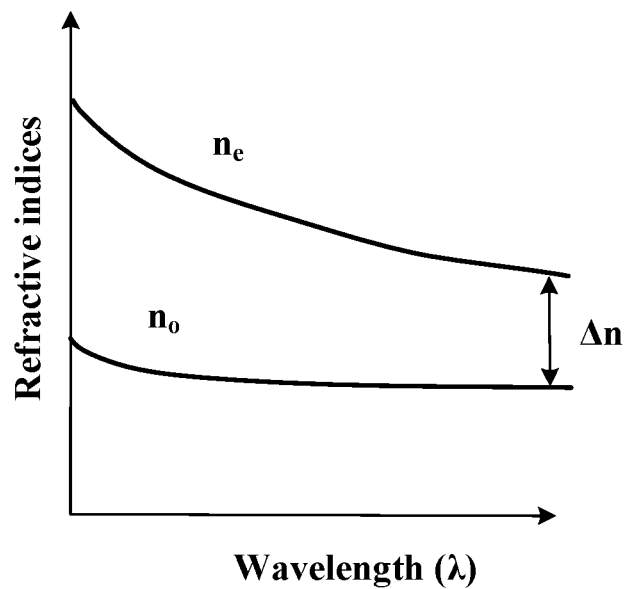
FIG. 1A schematically illustrates a diagram of wavelength dependent refractive indices in a birefringent material having a positive birefringence dispersion property.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The phrases "in-plane manipulation," "in-plane orientation," and "in-plane alignment pattern" refer to a manipulation, an orientation, and an alignment pattern in a transverse plane that may be a plane perpendicular to transmission of an incoming light, respectively. For example, in an x-y-z coordinate system, when the transmission of the incoming light is along a z-axis direction, the in-plane manipulation, the in-plane orientation, and the in-plane alignment pattern may refer to a manipulation, an orientation, and an alignment pattern configured within an x-y plane, respectively.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

Liquid crystal ("LC") optical elements, such as lenses, waveplates, gratings, etc., have been widely used in optical systems. For example, such optical elements have been implemented in near-eye displays ("NEDs") for augmented reality ("AR"), virtual reality ("VR"), or mixed reality ("MR") applications. To reduce the size and weight of the NEDs, and to increase efficiency, as well as to realize futuristic smart NEDs, thin, light-weight, and achromatic (e.g., broadband) optical elements are highly desirable. Conventionally, to achieve an achromatic LC optical element, multiple layers of LCs with different twist angles are applied to a substrate. Conventional technologies, however, suffer from issues such as bulky volume and color aberration.

To overcome various disadvantages associated with the conventional technologies for achieving the achromatic property, the present disclosure provides a formulation and design for a birefringent medium layer or film (e.g., a layer or film of a birefringent medium). The birefringent medium layer may function as an optical film with a predetermined optical function. In some embodiments, the birefringent medium may be optically anisotropic. The birefringent medium may include a plurality of birefringent materials. In some embodiments, the birefringent medium may include liquid crystals ("LCs"), e.g., active LCs including LC molecules that are reorientable by an external field (e.g., an external electric, magnetic, or light field), and/or passive LCs including LC molecules that are not reorientable by an external field. In some embodiments, the birefringent medium may include reactive mesogens ("RMs"). In some embodiments, the birefringent medium may include polymerized RMs, and the birefringent medium film may include a liquid crystal polymer ("LCP") film. The birefringent medium film may be thin (e.g., thickness in micrometer) and achromatic (e.g., broadband). The birefringent medium film may be structurally configured or fabricated (e.g., patterned)

to have optically anisotropic molecules (e.g., LCs and/or RMs) aligned in a predetermined alignment pattern, thereby providing at least one predetermined optical function. The birefringent medium film may be structurally patterned by various methods, for example, a light intensity based method, a light polarization based method, a light phase based method, a nanofabrication (e.g., nanoimprint) based method, a magnetic field based method, an electric field based method, etc., or a combination thereof. The at least one predetermined optical function may include, for example, focusing and/or defocusing a light beam, deflecting a light beam, managing a polarization of a light beam, etc.

A reactive mesogen ("RM") is a compound containing a mesogenic group and one or more functional groups that are suitable for polymerization, the latter also being referred to as "polymerizable group." The term "mesogenic group" refers to a part of a molecule or macromolecule endowed with sufficient anisotropy in both attractive and repulsive forces to contribute strongly to mesophase or, in particular, liquid-crystal mesophase formation in low-molar-mass and polymeric substances. Mesogenic groups, such as those of the non-amphiphilic type, may be calamitic or discotic. In some embodiments, the compound including a mesogenic group may not necessarily exhibit a liquid crystal ("LC") phase. In some embodiments, the compound including a mesogenic group may exhibit LC phase behaviors when mixed with another compound, or when the mesogenic compound or the mixture is polymerized. For simplicity, the term "liquid crystal" or "LC" may encompass both mesogenic and LC materials. RMs have features similar to those of LCs, including optically anisotropic and dielectric properties, self-assembly, and controlled alignment, e.g., through an alignment structure (e.g., an alignment layer). In some embodiments, RM monomers may be mixed with photo-initiators or thermal initiators, such that RMs may be in-situ photo-polymerized (or photo-crosslinked) or thermal-polymerized (or thermal-crosslinked) to stabilize the alignment pattern of the RMs. The polymerized RMs may retain their liquid crystalline alignment and optically anisotropic properties. Thus, RM is also referred to as a polymerizable mesogenic or liquid-crystalline compound, or a polymerizable LC. In some embodiments, RMs may be used in combination with host LCs (e.g., LCs that are not RMs). In some embodiments, RMs may be used without a host LC material. In addition, RMs may be used in combination with other polymerizable materials that are not LC materials.

Embodiments of the present disclosure provide an achromatic thin-film LC optical element realized by combining two types of RMs in a birefringent medium film: RMs whose birefringence has a positive dispersion ("PD") property (or referred to as RMs having a positive birefringence dispersion property) and RMs whose birefringence has a negative dispersion ("ND") property (or referred to as RMs having a negative birefringence dispersion property). In the present description, for simplicity, a material whose birefringence has a positive dispersion property may be referred to as a material having a PD property. A material whose birefringence has a negative dispersion property may be referred to as a material having an ND property. Accordingly, RMs having a positive birefringence dispersion property is also referred to as RMs having PD property or PD-RMs for short. RMs having a negative birefringence dispersion is also referred to as RMs having an ND property or ND-RMs for short. In some embodiments, the birefringent medium film of the LC optical element may include a first layer of PD-RMs and a second layer of ND-RMs stacked together. In some embodiments, the birefringent medium film of the LC optical element may include a single layer of RMs, which may include a combination of PD-RMs and ND-RMs at a suitable mixing ratio, such as 1:1, 1:2, 1:3, 2:1, 3:1, etc., by volume or weight. In either configuration, the RMs, whether having an ND property or a PD property, may be aligned in a predetermined pattern (e.g., a predetermined in-plane alignment pattern) to achieve at least one predetermined optical function of the LC optical element. In either configuration, the LC optical element may achieve an achromatic property (e.g., broadband) with respect to an optical spectrum of interest (i.e., a predetermined wavelength range, e.g., a visible wavelength range). In some embodiments, the aligned RMs, whether having an ND property or a PD property, may be further photo-polymerized (or photo-crosslinked) or thermal-polymerized (or thermal-crosslinked) to stabilize the alignment pattern of the RMs, resulting in an LCP film. In some embodiments, the birefringent medium film may include more than one type of PD-RMs with different birefringence dispersion properties. In some embodiments, the birefringent medium film may include more than one type of ND-RMs with different birefringence dispersion properties. In some embodiments, the birefringent medium film may include more than one type of PD-RMs with different birefringence dispersion properties and more than one type of ND-RMs with different birefringence dispersion properties.

In some embodiments, the at least one predetermined optical function of the LC optical element may be based on a manipulation (e.g., an in-plane manipulation) of the optic axis of the birefringent medium. Such thin-film LC optical elements may be referred to as Pancharatnam Berry Phase ("PBP") elements, geometric phase ("GP") elements, cycloidal diffractive waveplate ("CDW"), polarization elements, polarization volume elements, or polarization volume hologram ("PVH") elements. In some embodiments, the manipulation of the optic axis of the birefringent medium may be realized by configuring an alignment pattern (e.g., an in-plane alignment pattern) of the RMs included in the birefringent medium. Depending on the alignment pattern of the RMs included in the birefringent medium, the LC optical element may function as a transmissive-type achromatic optical element, a reflective-type achromatic optical element, or both a transmissive-type and a reflective-type achromatic optical element. The LC optical element may be included in or implemented as a prism, a lens, a beam refractor, a lens array, a prims array, or a phase retarder, etc., which may have properties such as broadband, adaptive, optically efficient, light-weight, and customizable. In some embodiments, the LC optical element may be passive. In some embodiments, the LC optical element may be active.

A birefringent material may have a positive birefringence dispersion property or a negative birefringence dispersion property. The positive birefringence dispersion property may indicate that the birefringence ($\Delta n$) of the birefringent material decreases as a wavelength ($\lambda$) of a light (e.g., an incident light) increases. The negative birefringence dispersion property may indicate that the birefringence ($\Delta n$) of the birefringent material increases as the wavelength ($\lambda$) of the light increases. The birefringence $\Delta n$ may be defined as ($n_e - n_o$), where $n_e$ and $n_o$ are the extraordinary and ordinary refractive indices of the birefringent material, respectively.

FIG. 1A schematically illustrates a diagram of wavelength dependent refractive indices of a birefringent material having a PD property. As shown in FIG. 1A, for a birefringent material having a PD property, the extraordinary refractive index $n_e$ decreases relatively rapidly while the ordinary refractive index $n_o$ decreases relatively slowly as the wavelength (λ) of the light increases. As a result, the birefringence ($\Delta n=n_e-n_o$) of the birefringent material having the PD property decreases as the wavelength (λ) of the light increases.

Figure 1B:
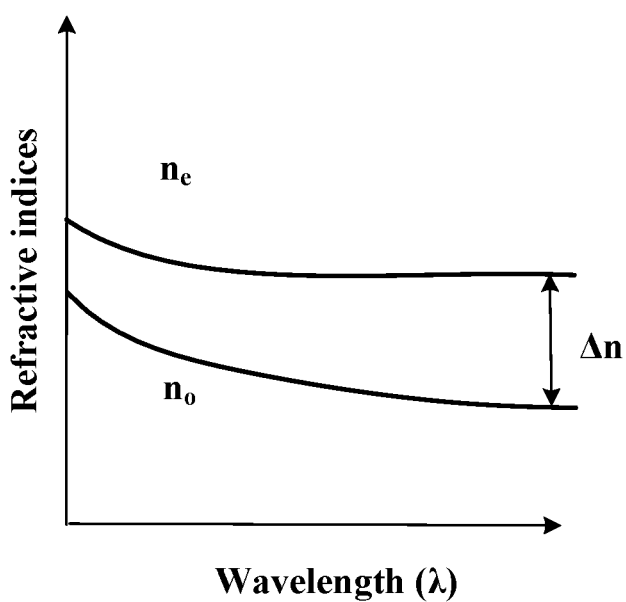
FIG. 1B schematically illustrates a diagram of wavelength dependent refractive indices in a birefringent material having a negative birefringence dispersion property.

FIG. 1B schematically illustrates a diagram of wavelength dependent refractive indices of a birefringent material having an ND property. As shown in FIG. 1A, for a birefringent material having an ND property, the ordinary refractive index $n_o$ decreases relatively rapidly while the extraordinary refractive index $n_e$ decreases relatively slowly as the wavelength (λ) of the light increases. As a result, the birefringence ($\Delta n=n_e-n_o$) of the birefringent material having the ND property increases as the wavelength (λ) of the light increases.

Figure 2:
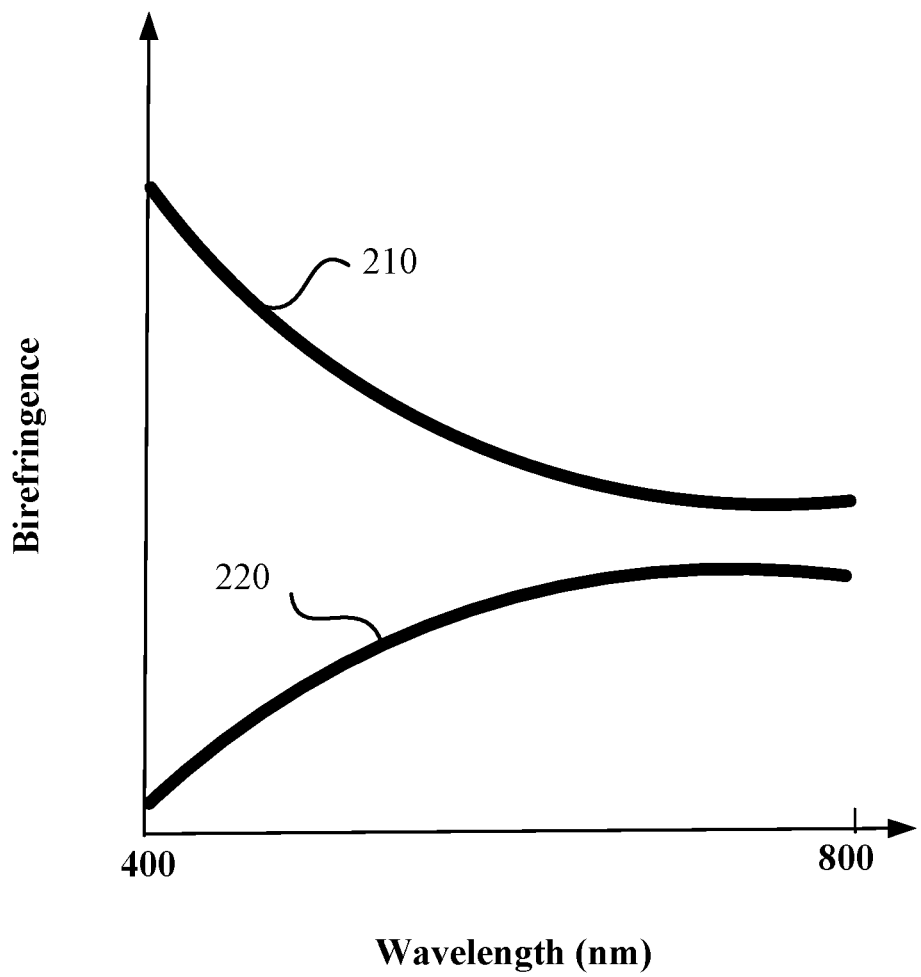
FIG. 2 schematically illustrates profiles of wavelength dependent birefringences of reactive mesogens ("RMs") having a negative birefringence dispersion property and RMs having a positive birefringence dispersion property, according to an embodiment of the present disclosure.

FIG. 2 schematically illustrates a profile of wavelength dependent birefringence of ND-RMs and PD-RMs, according to an embodiment of the present disclosure. The horizontal axis is the wavelength (unit: nm), and the vertical axis is the birefringence. The plot shown in FIG. 2 is not to scale, and is illustrated schematically to show the increasing and decreasing trends of the birefringences of the ND-RMs and PD-RMs as the wavelength increases. As shown in FIG. 2, curves 210 and 220 indicate the birefringences of the PD-RMs and ND-RMs, respectively. As shown in the curve 210, the birefringence of the PD-RMs decreases as the wavelength increases in the exemplary wavelength range from about 400 nm to about 780 nm. In some embodiments, the birefringence of the PD-RMs may decrease relatively rapidly as the wavelength increases from about 400 nm to about 550 nm, and may decrease relatively slowly as the wavelength increases from about 550 nm to about 780 nm. As shown in the curve 220, the birefringence of the ND-RMs increases as the wavelength increases in the exemplary wavelength range from about 400 nm to about 780 nm. In some embodiments, the birefringence of the ND-RMs may increase relatively rapidly as the wavelength increases from about 400 nm to about 550 nm, and may increase relatively slowly as the wavelength increases from about 550 nm to about 780 nm.

For an LC phase retarder including a layer of primarily PD-RMs or a layer of primarily ND-RMs, the phase retardation, $\Gamma=2\pi*d*\Delta n (\lambda)/\lambda$, of the LC phase retarder may vary with different wavelengths (λ) of the light, where d is a thickness of the layer of PD-RMs or the layer of ND-RMs, $\Delta n (\lambda)$ is a birefringence that is wavelength dependent (i.e., a function of the wavelength), λ, is the wavelength of the light. Thus, the bandwidth of the LC phase retarder including primarily PD-RMs or primarily ND-RMs may be narrow. The bandwidth of the LC phase retarder may refer to a wavelength range or band in which the phase retardation is substantially constant.

The PD-RMs and the ND-RMs may be combined in a suitable manner, such that in a desirable wavelength range (e.g., a visible wavelength range, a UV wavelength range, an IR wavelength range, or a combination thereof), the PD property of the PD-RMs and the ND property of the ND-RMs may compensate for each other. As a result of the compensation, a substantially constant dispersion property in the desirable wavelength range may be achieved. For example, as the wavelength gradually increases from about 400 nm to about 550 nm, the relatively rapid increasing trend of the birefringence of the ND-RMs may compensate for the relatively rapid decreasing trend of the birefringence of the PD-RMs. The compensation may result in a substantially constant dispersion property in a shorter (or lower end) wavelength range (e.g., about 400 nm to about 550 nm) of the desirable wavelength range. As the wavelength gradually increases from about 550 nm to about 780 nm, the relatively slow increasing trend of the birefringence of the ND-RMs may compensate for the relatively slow decreasing trend of the birefringence of the PD-RMs. The compensation may result in a substantially constant dispersion property in a longer (or higher end) wavelength range (e.g., about 550 nm to about 780 nm) of the desirable wavelength range. The combination of the PD-RMs and the ND-RMs may have properties (e.g., a birefringence, a birefringence dispersion property) that are between the properties of the PD-RMs and the properties of the ND-RMs.

Figure 3A:
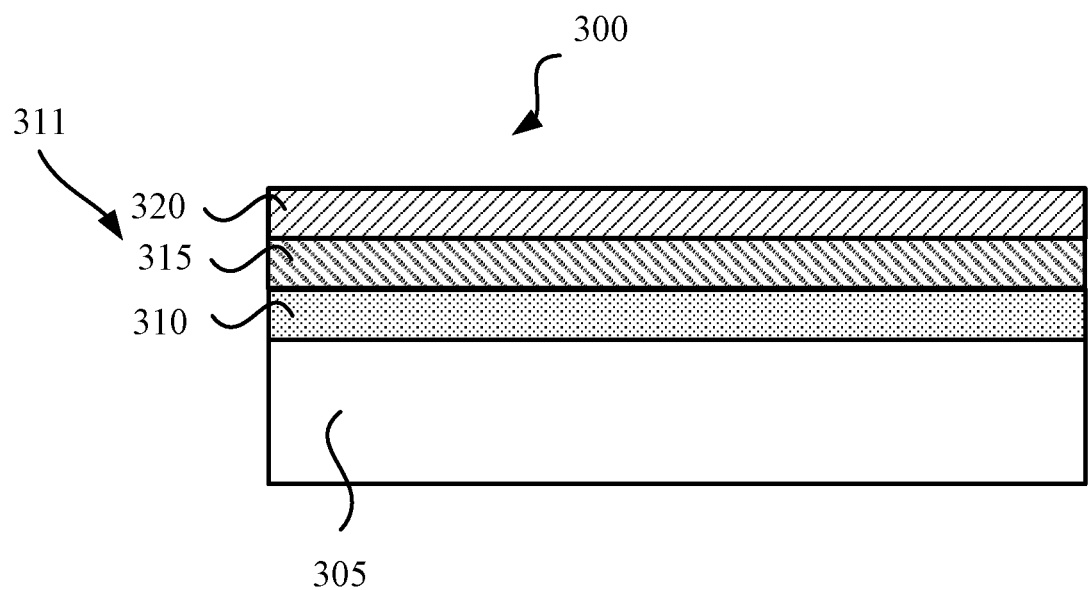
FIG. 3A schematically illustrates a cross-sectional view of an achromatic thin-film liquid crystal ("LC") optical element, according to an embodiment of the present disclosure.
Figure 3A:
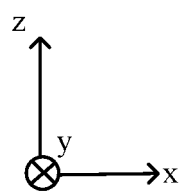

FIG. 3A illustrates an x-z cross-sectional view of an achromatic thin-film LC optical element or device 300 according to an embodiment of the present disclosure. As shown in FIG. 3A, the LC optical device 300 may include a substrate 305, an alignment structure 310 disposed at (e.g., on) the substrate 305, and a birefringent medium layer 311 disposed at (e.g., on) the alignment structure 310 (e.g., an alignment layer or film). The substrate 305 may provide support and protection to various layers and/or films disposed thereon. The substrate 305 may be substantially transparent at least in the visible wavelength band (e.g., about 380 nm to about 700 nm). In some embodiments, the substrate 305 may also be transparent in some or all of the infrared ("IR") band (e.g., about 700 nm to about 1 mm). The substrate 305 may include a suitable material that is substantially transparent to lights of the above-listed wavelength ranges, such as, a glass, a plastic, a sapphire, or a combination thereof, etc. The substrate 305 may be rigid, semi-rigid, flexible, or semi-flexible. In some embodiments, the substrate 305 may be a part of another optical element or device, or a part of another opto-electrical element or device. For example, the substrate 305 may be a solid optical lens or a part of a solid optical lens. In some embodiments, the substrate 305 may be a part of a functional device, such as a display screen. In some embodiments, the substrate 305 may be used to fabricate, store, or transport the LC optical device 300. In some embodiments, the substrate 305 may be detachable or removable from the rest of the LC optical device 300 after the rest of the LC optical device 300 is fabricated or transported to another place or device. That is, the substrate 305 may be used in fabrication, transportation, and/or storage to support the birefringent medium layer 311 provided on the substrate 305, and may be separated or removed from the birefringent medium layer 311 of the LC optical device 300 when the fabrication of the LC optical device 300 is completed, or when the LC optical device 300 is to be implemented in an optical device.

The alignment structure 310 may be disposed at (e.g., on) a surface of the substrate 305. For example, as shown in FIG. 3A, the alignment structure 310 may be disposed (e.g., coated, deposited, or affixed) at a top surface of the substrate 305 as a film, a layer, or a plate, etc. The birefringent medium layer 311 may be disposed at (e.g., on) the alignment structure 310. The birefringent medium layer 311 may be structurally patterned by various methods to align the RM molecules in the birefringent medium layer 311 in a predetermined alignment pattern. In some embodiments, the predetermined alignment pattern of the RM molecules in the birefringent medium layer 311 may be at least partially determined by the alignment structure 310. That is, the alignment structure 310 may be configured to at least partially align the RM molecules in the birefringent medium layer 311.

In some embodiments, the alignment structure 310 may include a photo-alignment material ("PAM") layer, which may include one or more photo-alignment materials. In some embodiments, the photo-alignment materials may include molecules that may undergo orientational ordering when subject to a polarized light irradiation. In some embodiments, the molecules may include elongated anisotropic photosensitive units (e.g., small molecules or fragments of polymeric molecules), which may be aligned in an alignment structure pattern when subject to the polarized light irradiation. The photosensitive units may be polarization sensitive. For example, the photosensitive units may be aligned by a light with a predetermined polarization, and may not be aligned by a light with a different polarization. In some embodiments, the alignment structure 310 may include a mechanically rubbed layer (e.g., a mechanically rubbed polymer layer). In some embodiments, the alignment structure 310 may include a polymer layer with anisotropic nanoimprint. In some embodiments, the alignment structure 310 may include a ferroelectric or ferromagnetic material configured to at least partially align the RM molecules in the birefringent medium layer 311 in a presence of a magnetic field or an electric field.

In some embodiments, the birefringent medium layer 311 may include a stack of a first birefringent material layer 315 and a second birefringent material layer 320. The first birefringent material layer 315 may include a first birefringent material with a first birefringence dispersion property, and the second birefringent material layer 320 may include a second birefringent material with a second birefringence dispersion property. In some embodiments, the first birefringent material may include a polymerized material such as polymerized RMs, and the second birefringent material may include a polymerized material such as polymerized RMs. That is, the first birefringent material layer 315 and the second birefringent material layer 320 may be formed by polymerizing RM monomers. The first birefringence dispersion property may be different from (e.g., opposite to) the second birefringence dispersion property. For example, the first birefringence dispersion property may be a negative birefringence dispersion property (or a positive birefringence dispersion property), and the second birefringence dispersion property may be a positive birefringence dispersion property (or a negative birefringence dispersion property). In some embodiments, the first birefringent material with the first birefringence dispersion property may include polymerized RMs having a negative dispersion birefringence property (referred to as polymerized ND-RMs for short). The second birefringent material having the second birefringence dispersion property may include polymerized RMs with a positive birefringence dispersion property (referred to as polymerized PD-RMs for short). The combination of the first birefringent material layer 315 and the second birefringent material layer 320 may render the overall birefringence dispersion property of the LC optical device 300 to be substantially constant with respect to an optical spectrum of interest (i.e., a predetermined wavelength range, such as a visible wavelength range), thereby achieving the achromatic optical property with respect to the optical spectrum of interest.

In some embodiments, any suitable polymerizable birefringent material may be used to form the first birefringent material layer 315 and the second birefringent material layer 320 by polymerizing (e.g., photo-polymerizing or thermal-polymerizing) the suitable polymerizable birefringent material. The polymerizable birefringent materials may include LCs (e.g., RMs) or any other suitable polymerizable birefringent materials that can be used for optical applications. In some embodiments, the polymerizable birefringent materials used to form the first birefringent material layer 315 and the second birefringent material layer 320 may be the same material (e.g., both being RMs) with different (e.g., positive and negative) birefringence dispersion properties. In some embodiments, the polymerizable birefringent materials used to form the first birefringent material layer 315 and the second birefringent material layer 320 may be different materials (e.g., RMs and another polymerizable birefringent material other than RMs) having different (e.g., positive and negative) birefringence dispersion properties.

In some embodiments, the first birefringent material layer 315 and the second birefringent material layer 320 may be structurally patterned to have optically anisotropic molecules of the first birefringent material and second birefringent material aligned in predetermined in-plane alignment patterns, respectively, thereby providing at least one predetermined optical function. Structured patterns of the first birefringent material layer 315 and the second birefringent material layer 320 may be defined by the alignment structure 310 and other alignment structures that may be included in the optical device 300. In some embodiments, a structured pattern of the first birefringent material layer 315 may include the polymerized ND-RMs aligned in a first alignment pattern. The first alignment pattern may be at least partially defined by the alignment structure 310. A structured pattern of the second layer 320 may include the polymerized PD-RMs aligned in a second alignment pattern. The second alignment pattern may be at least partially defined by the alignment structure 310. In some embodiments, when a second alignment structure is disposed on the first birefringent material layer 315, the second alignment pattern of the second birefringent material layer 320 may be at least partially defined by the second alignment structure, on which the second layer 320 may be disposed. In some embodiments, the first alignment pattern may be the same as the second alignment pattern. In some embodiments, the first alignment pattern may be different from the second alignment pattern. For discussion purpose, RMs are used as an example of the polymerizable birefringent material. Other suitable polymerizable birefringent materials may also be used in place of or in combination with RMs. Other suitable birefringent materials may also be used in place of RMs.

For illustrative purposes, in the following descriptions, a first liquid crystal polymer ("LCP") layer is used as an example of the first birefringent material layer 315 (hence, the first birefringent material layer 315 may be referred to as a first LCP layer 315). A second LCP layer is used as an example of the second birefringent material layer 320 (hence the second birefringent material layer 320 may be referred to as a second LCP layer 320). The birefringent medium layer 311 may be referred to as an LCP film or layer 311. The first LCP layer 315 may be disposed on the alignment structure 310 and may be in contact with the alignment structure 310. The alignment structure 310 may include a first surface facing the substrate 305 and an opposing second surface. The stack of the first LCP layer 315 and the second LCP layer 320 may be disposed on the second surface of the alignment structure 310. For example, the first LCP layer 315 may be formed by polymerizing a layer of PD-RM monomers disposed on (e.g., applied to or coated on) the second surface of the alignment structure 310. The second LCP layer 320 may be disposed on the first LCP layer 315. For example, after the first LCP layer 315 is disposed on the alignment structure 310, a layer of ND-RM monomers may be disposed on (e.g., applied to or coated on) the first LCP layer 315, and the second LCP layer 320 may be formed by polymerizing the ND-RM monomers disposed on (e.g., applied to or coated on) the first LCP layer 315.

The first LCP layer 315 and the second LCP layer 320 may be thin films including polymerized RMs (e.g., photo-polymerized RMs or thermal-polymerized RMs) with opposite dispersion properties. The first LCP layer 315 and the second LCP layer 320 may also be referred to as RM based polymer layers. In some embodiments, the first LCP layer 315 may be a thin film formed by polymerizing ND-RM monomers, and the second LCP layer 320 may be a thin film formed by polymerizing PD-RM monomers. In some embodiments, the first LCP layer 315 may be a thin film formed by polymerizing the PD-RM monomers, and the second LCP layer 320 may be a thin film formed by polymerizing the ND-RM monomers. In some embodiments, the alignment patterns of the RMs in the first LCP layer 315 and the second LCP layer 320 may be realized through aligning the RMs on the alignment structure 310. Due to anisotropic interfacial interaction, the structured pattern of the photosensitive units of the molecules of the photo-alignment materials included in the alignment structure 310 (when the alignment structure 310 includes a PAM layer) may determine the alignment of the RM monomers that are to be polymerized to form the first LCP layer 315 and the second LCP layer 320. In some embodiments, the alignment structure 310 may be detached or separated from the birefringent medium layer 311 when the birefringent medium layer 311 is to be implemented in an optical device or after the birefringent medium layer 311 is fabricated.

In some embodiments, the alignment structure 310 may be a first alignment structure. To enhance the structured pattern of the RM molecules in the second LCP layer 320, in some embodiments, a second alignment structure (not drawn in FIG. 3A) may be disposed between the first LCP layer 315 and the second LCP layer 320. For example, after the first LCP layer 315 is disposed on the first alignment structure 310, a second alignment structure may be disposed on the first LCP layer 315. The second LCP layer 320 may be disposed on the second alignment structure. In some embodiments, the second alignment structure may be a part of the birefringent medium layer 311, and may not be detachable from the first LCP layer 315 and the second LCP layer 320 when the birefringent medium layer 311 is to be implemented in an optical device or after the birefringent medium layer 311 is fabricated.

The number of LCP layers included in the birefringent medium layer 311 may be any suitable number, such as three, four, five, six, etc. In some embodiments, the number of alignment structures may not be limited to one or two, and may be more than two, such as three, four, five, six, etc. The number of LCP layers and the alignment structures may be determined based on specific applications. In some embodiments, at least one of the LCP layers may include one or more types of PD-RMs (or ND-RMs). When more than one type of PD-RMs (or ND-RMs) are included, the birefringence dispersion properties of the more than one type of PD-RMs (or ND-RMs) may be the same or may be different.

For discussion purposes, in an embodiment, the first LCP layer 315 is a thin film formed by polymerizing PD-RM monomers, and the second LCP layer 320 is a thin film formed by polymerizing ND-RM monomers. Thus, the phase retardation ($\Gamma_1 = 2\pi * d_1 * \Delta n_1 (\lambda)/\lambda$) provided by the first LCP layer 315 may decrease as the wavelength ($\lambda$) increases, and the phase retardation ($\Gamma_2 = 2\pi * d_2 * \Delta n_2(\lambda)/\lambda$) provided by the second LCP layer 320 may increase as the wavelength ($\lambda$) increases, where $\Gamma_1$ and $\Gamma_2$ represent the phase retardations of the first LCP layer 315 and the second LCP layer 320, respectively; $d_1$ and $d_2$ represent the thicknesses of the first LCP layer 315 and the second LCP layer 320, respectively; and $\Delta n_1 (\lambda)$ and $\Delta n_2 (\lambda)$ represent the wavelength dependent birefringences of the polymerized RMs in the first LCP layer 315 and the second LCP layer 320, respectively. That is, the first LCP layer 315 and the second LCP layer 320 including polymerized RMs with opposite dispersion properties may compensate for each other for phase retardation as the wavelength ($\lambda$) increases. In other words, the first LCP layer 315 and the second LCP layer 320 including polymerized RMs with opposite dispersion properties may exhibit a retardation compensation effect. Thus, by selecting the suitable profiles of the birefringence dispersion properties of the polymerized PD-RMs and ND-RMs with respect to an optical spectrum of interest (e.g., a visible wavelength range, an ultraviolet wavelength range, or an infrared wavelength range), and by configuring the thicknesses of the first LCP layer 315 and the second LCP layer 320, the total phase retardation ($\Gamma = \Gamma_1 + \Gamma_2$) provided by the LCP film may be substantially constant with respect to the optical spectrum of interest due to the retardation compensation effect.

A profile of the birefringence dispersion property of the RMs refers to a relationship between the birefringence and the wavelength of an incident light. For example, in some embodiments, the profile of the birefringence dispersion property of the RMs may be represented by a mathematic function of the wavelength. The profiles of the first birefringence dispersion property and the second birefringence dispersion property may be selected such that the combination of the profiles may result in a combined profile that may be represented by a function that is substantially proportional to the wavelength (e.g., $K*\lambda$, where K is a constant independent of wavelength $\lambda$). That is, the thicknesses and the birefringence dispersion properties may substantially satisfy the following condition: $d_1 * \Delta n_1(\lambda) + d_2 * \Delta n_2(\lambda)$ may be substantially equal to $K*\lambda$ for a predetermined wavelength range. In other words, a sum of a product between a first thickness $d_1$ of the first LCP layer 315 and a first birefringence $\Delta n_1(\lambda)$ of the RMs in the first LCP layer 315 and a product between a second thickness $d_2$ of the second LCP layer 320 and a second birefringence $\Delta n_2(\lambda)$ of the RMs in the second LCP layer 320 may be substantially proportional to the wavelength $\lambda$, i.e., $K*\lambda$. As a result, the total phase retardation $\Gamma = \Gamma_1 + \Gamma_2$ may be substantially equal to $2\pi * K * \lambda / \lambda = 2\pi * K$, which may be independent of the wavelength in the predetermined wavelength range. In some embodiments, the LC optical device 300 may function as a zero-order optical device (e.g., a zero-order waveplate), and K may be a number greater than 0 and equal to or less than 1, for example, 0.25, 0.5, or 1. In some embodiments, the LC optical device 300 may function as a multiple-order optical device (e.g., a multiple-order waveplate), and K may be a number greater than 1, for example, 1.25, 1.5, or 2. The above example relationship may be one embodiment. In some embodiments, the total phase retardation $\Gamma = \Gamma_1 + \Gamma_2$ may be wavelength dependent, but the wavelength dependent variation may be sufficiently small (e.g., ±1%, ±2%, ±3%, ±4%, ±5%, ±10%), such that the total phase retardation may still be regarded as substantially wavelength independent (e.g., substantially constant in a wavelength range).

In some embodiments, the LC optical element 300 may exhibit an overall substantially constant phase retardation, i.e., broadband, with respect to the optical spectrum of interest (e.g., in a visible wavelength range, an IR wavelength range, a UV wavelength range, or a combination thereof) due to the retardation compensation effect. The profiles of the birefringence dispersion properties of the polymerized ND-RMs and polymerized PD-RMs with respect to the optical spectrum of interest may be selected based on profiles of the birefringence dispersion properties of the corresponding RM monomers, i.e., RM monomers before polymerization, with respect to the optical spectrum of interest. The profiles of a birefringence dispersion property of RM monomers before polymerization and a birefringence dispersion property of polymerized RM after polymerization may be substantially the same.

Figure 3B:
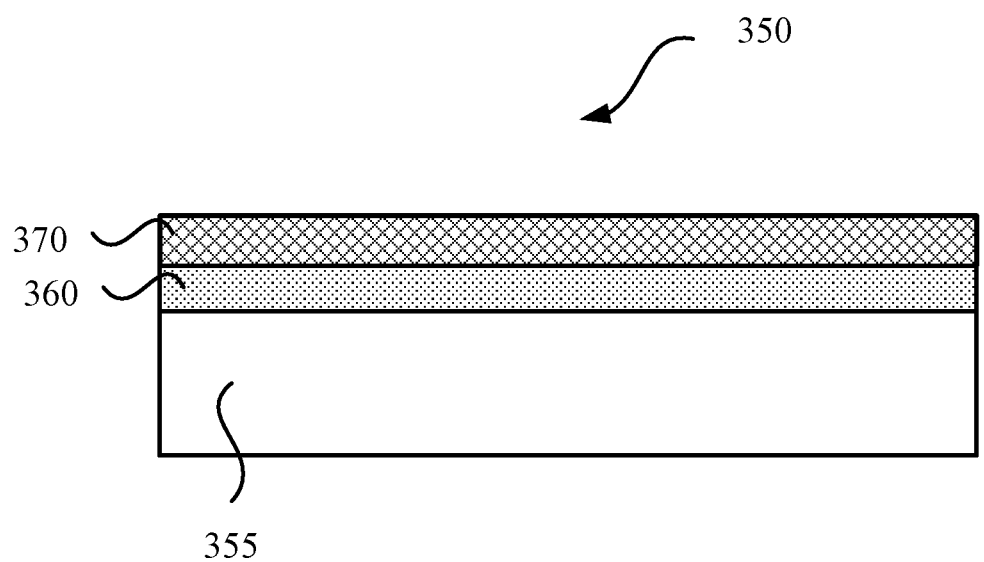
FIG. 3B schematically illustrates a cross-sectional view of an achromatic thin-film LC optical element, according to another embodiment of the disclosure.
Figure 3B:
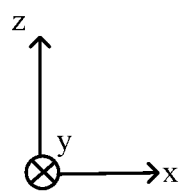

FIG. 3B illustrates an x-z cross-sectional view of an achromatic thin-film LC optical element or device 350 according to another embodiment of the disclosure. The LC optical device 350 may include structures or elements that are the same as or similar to those included in the LC optical device 300 shown in FIG. 3A. Descriptions of the same or similar structures or elements included in the embodiment shown in FIG. 3B can refer to the above descriptions rendered in connection with the embodiment shown in FIG. 3A. As shown in FIG. 3B, the LC optical device 350 may include a substrate 355, an alignment structure 360 disposed on the substrate 355, and a birefringent medium layer 370 disposed on the alignment structure 360. The substrate 355 and the alignment structure 360 may be similar to the substrate 305 and the alignment structure 310 shown in FIG. 3A.

The birefringent medium layer 370 shown in FIG. 3B may be a single thin film including a combination of a first birefringent material having a first birefringence dispersion property and a second birefringent material having a second birefringence dispersion property. The first birefringence dispersion property may be different from (e.g., opposite to) the second birefringence dispersion property. For example, the first birefringence dispersion property may be the negative birefringence dispersion property (or positive birefringence dispersion property), and the second birefringence dispersion property may be the positive birefringence dispersion property (or negative birefringence dispersion property). In some embodiments, the first birefringent material may include a polymerized birefringent material such as polymerized RMs, and the second birefringent material may include a polymerized birefringent material such as polymerized RMs. In some embodiments, the first birefringent material having the first birefringence dispersion property may include polymerized ND-RMs. The second birefringent material having the second birefringence dispersion property may include polymerized PD-RMs.

In some embodiments, the birefringent medium layer 370 may be formed by polymerizing a mixture of RM monomers (or any other suitable polymerizable birefringent materials) of opposite dispersion properties, such as a mixture of PD-RM monomers and ND-RM monomers. That is, the birefringent medium layer 370 may be a thin film including a combination of polymerized PD-RMs and ND-RMs having different (e.g., opposite) birefringence dispersion properties. In some embodiments, the birefringent medium layer 370 may also be referred to as an LCP film or layer 370. In some embodiments, the polymerized PD-RMs and ND-RMs may be uniformly distributed in the LCP film 370. In some embodiments, the weight percentage of the polymerized PD-RMs may be different from that of the polymerized ND-RMs. The weight percentage of the polymerized PD-RMs and polymerized ND-RMs in the combination of polymerized PD-RMs and ND-RMs may be substantially similar to the weight percentage of the PD-RM monomers and ND-RM monomers in the mixture of PD-RM monomers and ND-RM monomers before polymerization, respectively. In some embodiments, the volume percentage of the polymerized PD-RMs may be the same as or different from that of the polymerized ND-RMs.

In some embodiments, the birefringent medium layer 370 may include more than one type of PD-RMs with different birefringence dispersion properties. In some embodiments, the birefringent medium layer 370 may include more than one type of ND-RMs with different birefringence dispersion properties. In some embodiments, the birefringent medium layer 370 may include more than one type of PD-RMs with different birefringence dispersion properties and more than one type of ND-RMs with different birefringence dispersion properties. Through configuring the compositions of the more than one type of PD-RMs with different birefringence dispersion properties and/or the more than one type of ND-RMs with different birefringence dispersion properties, and configuring the concentrations (e.g., weight percentage, volume percentage, and/or distribution) of the more than one type of PD-RMs with different birefringence dispersion properties and/or the more than one type of ND-RMs with different birefringence dispersion properties, the phase retardation provided by the birefringent medium layer 370 may be substantially constant with respect to the optical spectrum of interest (e.g., a visible wavelength range).

In some embodiments, the achromatic thin-film LC optical element or device 350 may include two or more birefringent medium layers 370. Each birefringent medium layer 370 may include a combination of one or more types of PD-RMs and one or more types of ND-RMs. The birefringence dispersion property profile of the birefringence medium included in each birefringent medium layer 370 may be different from one another. Various combinations of PD-RMs and ND-RMs described herein may be implemented to achieve an overall achromatic property in a desirable wavelength range.

Through configuring the compositions of the PD-RMs and ND-RMs that are included in the birefringent medium layer 370, suitable profiles of the birefringence dispersion properties of the PD-RMs and ND-RMs that are included in the birefringent medium layer 370 may be realized with respect to an optical spectrum of interest (e.g., visible wavelength range). Through configuring the concentrations (e.g., weight percentage, volume percentage, and/or distribution) of the PD-RM monomers and ND-RM monomers in the mixture of RM monomers, the phase retardation provided by the birefringent medium layer 370 may be substantially constant with respect to the optical spectrum of interest (e.g., a visible wavelength range) due to the retardation compensation effect provided by the combined polymerized PD-RMs and ND-RMs. Accordingly, the LC optical device 350 may exhibit an overall substantially constant phase retardation, i.e., broadband, with respect to the optical spectrum of interest (e.g., a visible wavelength range) due to the retardation compensation effect. In other words, the phase retardation provided by the birefringent medium layer 370 may be substantially wavelength independent (e.g., achromatic) with respect to the optical spectrum of interest (e.g., a visible wavelength range). In some embodiments, the profiles of the birefringence dispersion property of the RMs before and after polymerization may be substantially the same.

The birefringent medium layer 370 may be structurally patterned to have a predetermined in-plane alignment pattern of RMs (a combination of PD-RMs and ND-RMs) to provide at least one predetermined optical function. The predetermined in-plane alignment pattern may be at least partially defined by the alignment structure 360. For example, when the mixture of the PD-RM monomers and the ND-RM monomers is disposed onto (e.g., applied to or coated onto) the alignment structure 360, the RM monomers may be aligned according to a predetermined alignment pattern defined by the alignment structure 360. When the RM monomers are polymerized (e.g., by UV curing), such an alignment of the RM monomers may be retained in the polymerized RMs.

Figure 3C:
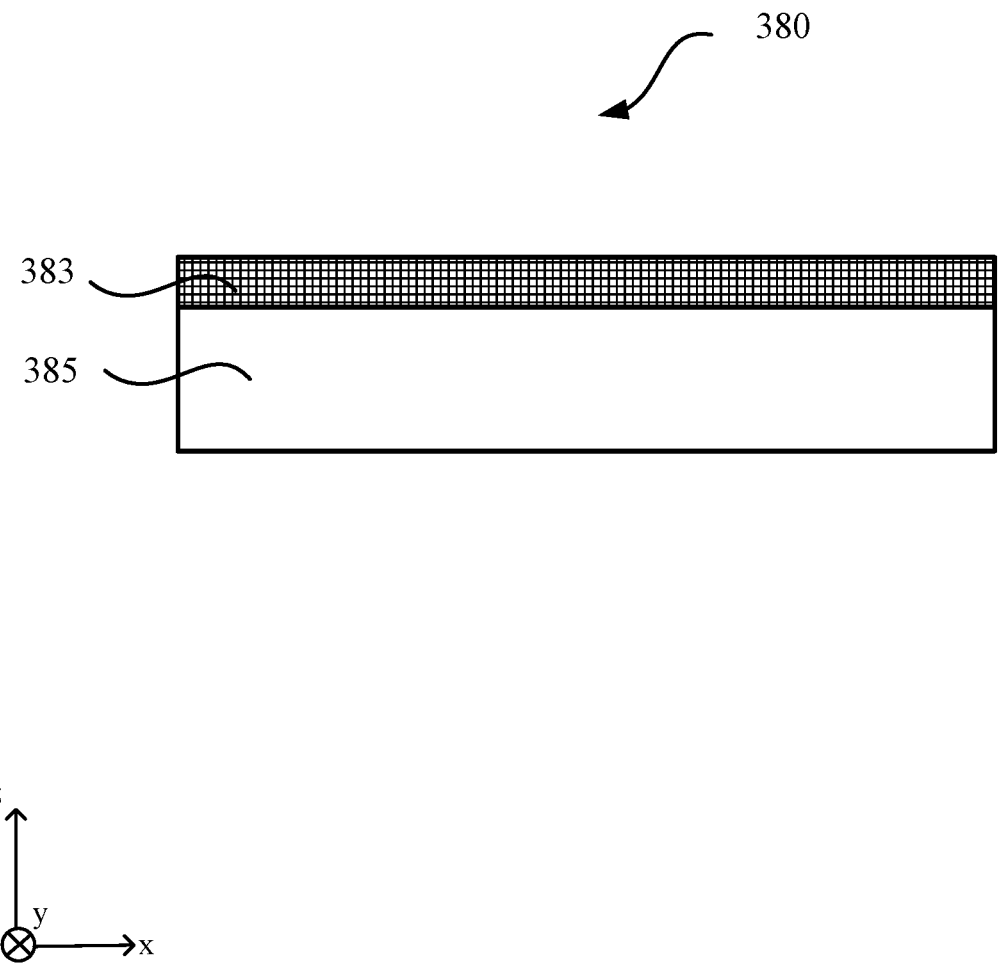
FIG. 3C schematically illustrates a cross-sectional view of an achromatic thin-film LC optical element, according to another embodiment of the disclosure.

FIG. 3C illustrates an x-z cross-sectional view of an achromatic thin-film LC optical element or device 380 according to another embodiment of the disclosure. The LC optical device 380 may include structures or elements that are the same as or similar to those included in the LC optical device 300 shown in FIG. 3A. Descriptions of the same or similar structures or elements included in the embodiment shown in FIG. 3C can refer to the above descriptions rendered in connection with the embodiment shown in FIG. 3A. As shown in FIG. 3C, the LC optical device 380 may include a substrate 385 and a birefringent medium layer 383 disposed on the substrate 385. The birefringent medium layer 383 may be similar to the birefringent medium layer 311 shown in FIG. 3A or the birefringent medium layer 370 shown in FIG. 3B. The phase retardation provided by the birefringent medium layer 383 may be substantially constant with respect to the optical spectrum of interest (e.g., a visible wavelength range). In other words, the phase retardation provided by the birefringent medium layer 383 may be substantially wavelength independent (e.g., achromatic).

The structured pattern of the birefringent medium layer 383 may be determined by a predetermined alignment pattern provided by the substrate 385. That is, optically anisotropic molecules included in the birefringent medium layer 383 may be aligned on the substrate 385. For example, an in-plane alignment pattern of the optically anisotropic molecules included in the birefringent medium layer 383 may be formed by aligning the optically anisotropic molecules on the substrate 385. In some embodiments, the substrate 385 may be fabricated from an organic material, such as amorphous or liquid crystalline polymers, crosslinkable monomers including those having LC properties, or may be fabricated from an inorganic material, such as metals or oxides used for manufacturing of metasurfaces. The material(s) of the substrate 385 may be isotropic or anisotropic. In some embodiments, the substrate 385 may be nanofabricated from a resist material that is transparent or nearly transparent to a range of electromagnetic frequencies, such as the visible band. The resist material may be a form of thermoplastic, polymer, optically transparent photoresist, and so on. After set or cured, the resist material may provide an alignment to the birefringent medium layer 383 disposed onto the substrate 385. That is, the substrate 385 may function as an alignment structure (e.g., an alignment layer) for the birefringent medium layer 383. Various alignment patterns and features may be realized using the nanofabrication techniques of the substrate 385, which allows the creation of an alignment pattern of the birefringent medium layer 383 with high customizability.

Figure 3D:
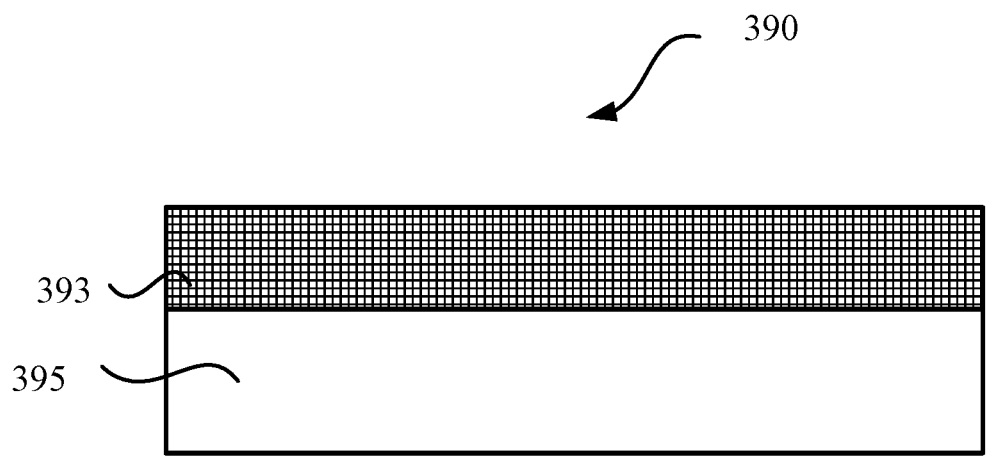
FIG. 3D schematically illustrates a cross-sectional view of an achromatic thin-film LC optical element, according to another embodiment of the disclosure.

FIG. 3D illustrates an x-z cross-sectional view of an achromatic thin-film LC optical element or device 390 according to another embodiment of the disclosure. The LC optical device 390 may include structures or elements that are the same as or similar to those included in the LC optical device 300 shown in FIG. 3A. Descriptions of the same or similar structures or elements included in the embodiment shown in FIG. 3D can refer to the above descriptions rendered in connection with the embodiment shown in FIG. 3A. As shown in FIG. 3D, the LC optical device 390 may include a substrate 395 and a birefringent medium layer 393 disposed on the substrate 395. In some embodiments, the birefringent medium layer 393 may include first and second layers including birefringent materials with opposite birefringence dispersion properties (similar to the birefringent medium layer 311 shown in FIG. 3A). In some embodiments, the birefringent medium layer 393 may include a single layer including a combination of birefringent materials with opposite birefringence dispersion properties (similar to the birefringent medium layer 370 shown in FIG. 3B). The phase retardation provided by the birefringent medium layer 393 may be substantially constant with respect to the optical spectrum of interest (e.g., a visible wavelength range). In other words, the phase retardation provided by the birefringent medium layer 393 may be substantially wavelength independent (e.g., achromatic).

In some embodiments, the birefringent medium layer 393 may include birefringent materials that have been aligned with polarized light irradiation and photo-crosslinked with induced birefringence. Molecules in the birefringent materials may include photosensitive units. A photoalignment of photosensitive units in the molecules of the birefringent materials may occur in a volume of birefringent materials. For example, when irradiation is provided with holographically created patterns of polarized light, the alignment patterns of the photosensitive units may occur in the birefringent medium layer 393. That is, an in-plane alignment pattern of the molecules in the birefringent materials may be directly induced by polarized light irradiation. Such an alignment process may be referred to bulk-mediated photoalignment.

In some embodiments, one or more of the embodiments of the birefringent medium layer or film shown in FIGS. 3A-3D may be combined. The phase retardation provided by the LC optical device of this embodiment may be substantially constant with respect to the optical spectrum of interest (e.g., a visible wavelength range). In other words, the phase retardation provided by the LC optical device of this embodiment may be substantially wavelength independent (e.g., achromatic). For example, in an embodiment, an LC optical device may include a first birefringent medium layer that may be similar to the birefringent medium layer 311 (shown in FIG. 3A) and a second birefringent medium layer that may be similar to the birefringent medium layer 370 (shown in FIG. 3B). In an embodiment, an LC optical device may include a first birefringent medium layer that may be similar to the birefringent medium layer 311 (shown in FIG. 3A) and a second birefringent medium layer that may be similar to the birefringent medium layer 383 (shown in FIG. 3C). In an embodiment, an LC optical device may include a first birefringent medium layer that may be similar to the birefringent medium layer 311 (shown in FIG. 3A) and a second birefringent medium layer that may be similar to the birefringent medium layer 393 (shown in FIG. 3D). In an embodiment, an LC optical device may include a first birefringent medium layer that may be similar to the birefringent medium layer 370 (shown in FIG. 3B) and a second birefringent medium layer that may be similar to the birefringent medium layer 383 (shown in FIG. 3C). In an embodiment, an LC optical device may include a first birefringent medium layer that may be similar to the birefringent medium layer 370 (shown in FIG. 3B) and a second birefringent medium layer that may be similar to the birefringent medium layer 393 (shown in FIG. 3D). In an embodiment, an LC optical device may include a first birefringent medium layer that may be similar to the birefringent medium layer 383 (shown in FIG. 3C) and a second birefringent medium layer that may be similar to the birefringent medium layer 393 (shown in FIG. 3D).

Referring to FIGS. 3A-3D, the achromatic thin-film LC optical device 300, 350, 380, or 390 may be a rigid or a flexible thin-film LC optical element. When the LC optical device 300, 350, 380, or 390 is flexible, the LC optical device 300, 350, 380, or 390 may be bendable, deformable, foldable, rollable, or collapsible. In some embodiments, the LC optical device 300, 350, 380, or 390 may have a curved shape. The flexible LC optical device 300 or 350 may be applied to or implemented in a device where a rigid optical element may not be desirable or suitable, such as a curved surface or a flexible structure. In some embodiments, the LC optical device 300, 350, 380, or 390 may be disposed at (e.g., coated to, attached to, affixed to, etc.) a suitable surface without affecting the optical function. In some embodiments, multiple LC optical devices 300, 350, 380, or 390 may be stacked or coupled together to form an optical series. In some embodiments, the LC optical device 300, 350, 380, or 390 may function as a passive device.

In some embodiments, the birefringent materials (e.g., RM monomers) included in the achromatic thin-film LC optical device 300, 350, 380, or 390 may not be polymerized, and the achromatic thin-film LC optical device 300, 350, 380, or 390 may function as an active device, e.g., switchable under an external electric field. In some embodiments, the birefringent materials included in the achromatic thin-film LC optical device 300, 350, 380, or 390 may include active LCs, and the achromatic thin-film LC optical device 300, 350, 380, or 390 may function as an active device, e.g., switchable under an external electric field. In some embodiments, the achromatic thin-film LC optical device 300, 350, 380, or 390 may include additional layers, such as two or more electrode layers. For example, in the LC optical device 300 shown in FIG. 3A, the electrode layers may be disposed to sandwich the birefringent medium layer 311 including the first birefringent material layer 315 and the second birefringent material layer 320 to provide a driving voltage for the switch. In the LC optical device 350 shown in FIG. 3B, the electrode layers may be disposed to sandwich the single-layer birefringent medium layer 370 to provide a driving voltage for the switch. In the LC optical device 380 shown in FIG. 3C, the electrode layers may be disposed to sandwich the first birefringent material layer 381 and the second birefringent material layer 382 to provide a driving voltage for the switch. In the LC optical device 390 shown in FIG. 3D, the electrode layers may be disposed to sandwich the birefringent medium layer 393 to provide a driving voltage for the switch. The electrode layers may include a flexible transparent conductive layer, such as indium tin oxide ("ITO") disposed on a plastic film. In some embodiments, the plastic film may include polyethylene terephthalate ("PET"). In some embodiments, the plastic film may include cellulose triacetate ("TAC"), which is a type of flexible plastic with a substantially low birefringence.

In some embodiments, the at least one predetermined optical function of the LC optical device 300, 350, 380, or 390 may be based on the manipulation of the optic axis of the birefringent medium included in the birefringent medium film. In some embodiments, the manipulation of the optic axis of the birefringent medium may be realized by configuring an in-plane alignment pattern of optically anisotropic molecules (e.g., RM monomers) via aligning the optically anisotropic molecules on the alignment structure 310 or 360. In some embodiments, the manipulation of the optic axis of the birefringent medium may be realized by configuring an in-plane alignment pattern of the optically anisotropic molecules (e.g., RM monomers) via aligning the optically anisotropic molecules by the substrate 385. In some embodiments, the manipulation of the optic axis of the birefringent medium may be realized by configuring an in-plane alignment pattern of the optically anisotropic molecules via aligning (e.g., directly aligning) the optically anisotropic molecules under polarized light irradiation. As discussed above, the alignment of the RM monomers may be retained after polymerization. That is, the polymerized RMs included in the LCP film may have a substantially same alignment pattern as the RM monomers that form the LCP film when polymerized. According to the formed alignment pattern of the optically anisotropic molecules, the LC optical device 300, 350, 380, or 390 may function as a transmissive, reflective, or both transmissive and reflective optical element, such as a prism, a lens, a beam refractor, a lens array, a prism array, a phase retarder, etc. Various designs of the achromatic thin-film LC optical elements or devices are described. These designs are merely illustrative, and other designs of the achromatic thin-film LC optical elements or devices may be derived based on the principles described herein.

Figure 4A:
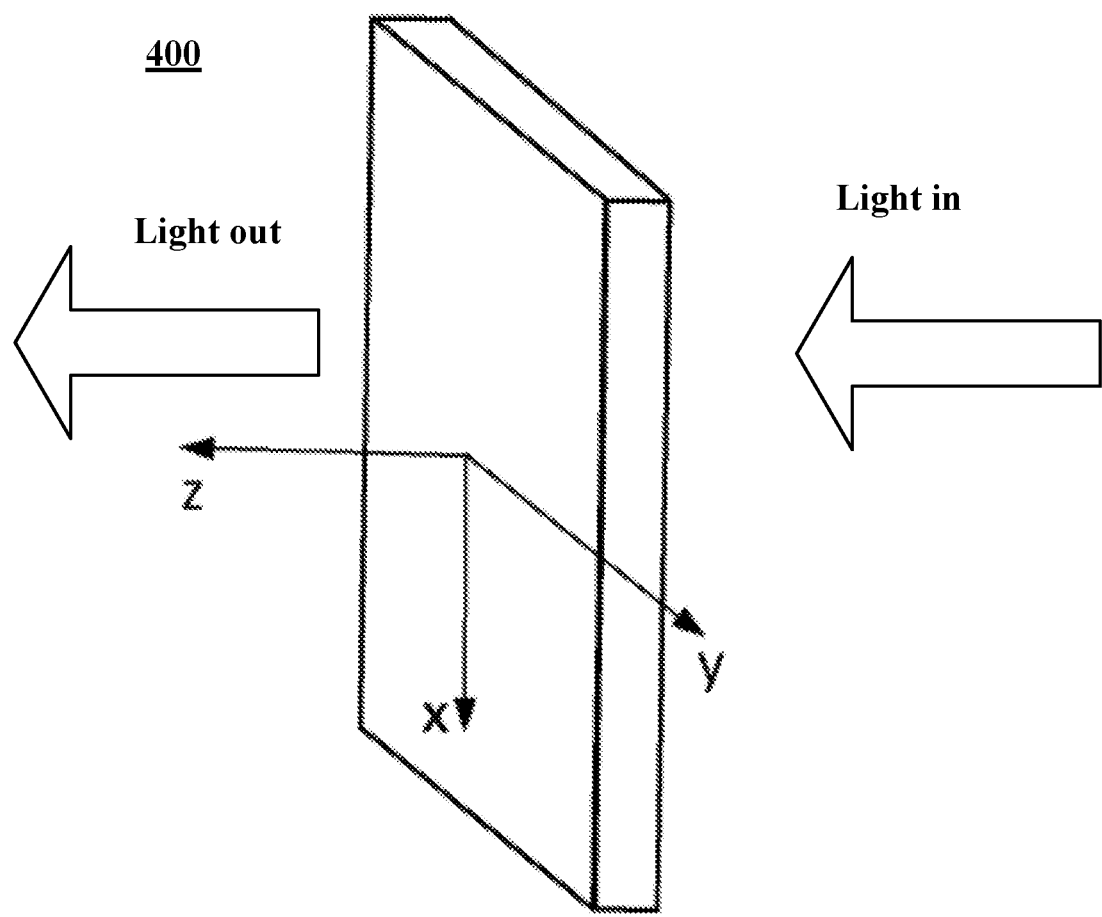
FIG. 4A schematically illustrates a diagram of a transmissive-type achromatic thin-film LC optical element, according to an embodiment of the present disclosure.

FIG. 4A is a transmissive-type achromatic thin-film LC optical element or device 400, which may include the disclosed birefringent medium film or layer described herein, according to an embodiment of the present disclosure. According to the alignment pattern of the optically anisotropic molecules in the birefringent medium film, the thin-film LC optical device 400 may function as a transmissive optical element, such as a prism, a lens, a beam refractor, a lens array, a prism array, or a phase retarder, etc. For discussion purposes, in the following descriptions, RMs are used as an example of the optically anisotropic molecules included in the birefringent medium film, and the birefringent medium film may include an LCP film.

Figure 4B:
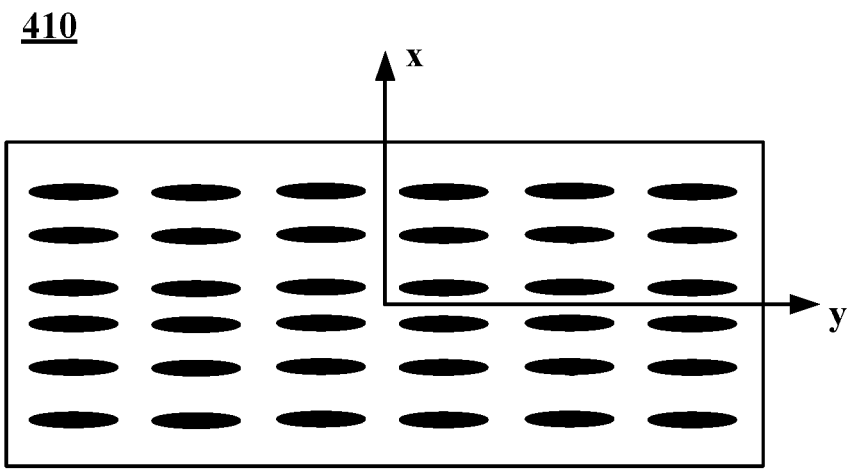
FIG. 4B schematically illustrates a cross-sectional view of RM orientations when the LC optical element in FIG. 4A functions as a phase retarder, according to an embodiment of the present disclosure.

FIG. 4B illustrates an x-y cross-sectional view of an alignment pattern 410 of RMs when the thin-film LC optical device 400 shown in FIG. 4A functions as an LC phase retarder 400 according to an embodiment of the present disclosure. As shown in FIG. 4B, the alignment direction of the RMs (e.g., in the y-axis in FIG. 4B) may be uniform across the entire LC phase retarder 400. In some embodiments, the uniform alignment of the RMs may be realized by aligning the RM monomers (that form the LCP film after being polymerized) on a uniformly aligned alignment structure. To effectively change the phase of the transmitted light, the linearly polarized incident light may be configured to align its polarization axis substantially along the alignment direction of the RMs.

The LC phase retarder 400 may also be effectively configured to function as a polarization management component in an optical device or an optical system. For example, when the LC phase retarder 400 is a half-wave plate, a linearly polarized incident light having a first polarization direction may be converted into a linearly polarized output light having a second polarization direction perpendicular to the first polarization direction. When the LC phase retarder 400 is a half-wave plate, a circularly polarized incident light may be converted into a circularly polarized output light having a reversed handedness. When the LC phase retarder 400 is a quarter-wave plate, a linearly polarized incident light may be converted into a circularly polarized output light. In some embodiments, when the LC phase retarder 400 is configured to control the polarization of the incident light, the polarization axis of the linearly polarized incident light may be oriented at about 35-50° angle with respect to the alignment direction of the RMs included in the LC phase retarder 400.

Figure 4C:
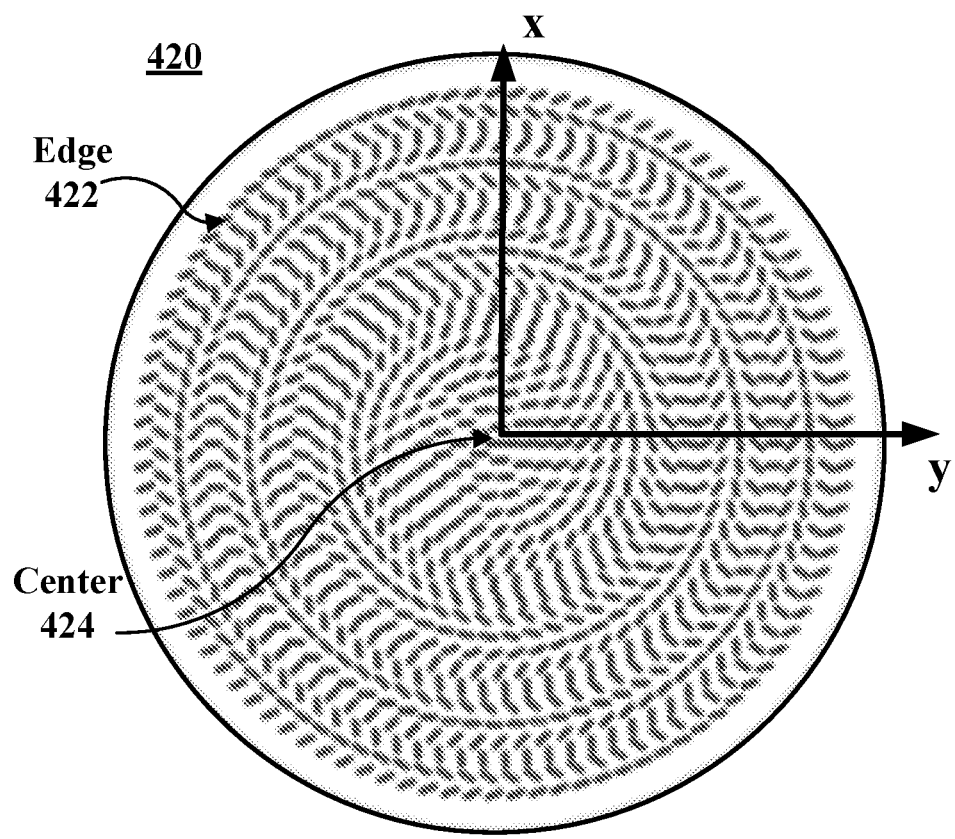
FIG. 4C schematically illustrates a cross-sectional view of RM orientations when the LC optical element in FIG. 4A functions as a Pancharatnam Berry Phase ("PBP") lens, according to an embodiment of the present disclosure.

FIG. 4C illustrates an x-y cross-sectional view of an alignment pattern 420 of RMs when the thin-film LC optical device 400 shown in FIG. 4A functions as a PBP lens 400. As shown in FIG. 4C, the PBP lens 400 may generate a respective lens profile based on an in-plane orientation (an azimuth angle θ) of the RMs, in which the phase difference may be T=2θ. The azimuth angles of RM molecules may vary continuously from a center 424 to an edge 422 of the PBP lens 400, with a variable pitch Λ. A pitch is defined as a distance between the RM molecules, in which the azimuth angle is rotated by about 180° from an initial state. In contrast, a conventional LC lens creates a lens profile based on a birefringence (Δn), a layer thickness (d) of liquid crystals, and a number N of Fresnel zones (in the case of a Fresnel lens design), in which the phase difference is T=d*Δn(λ)*N*2π/λ. Accordingly, the PBP lens 400 may have a large aperture size and may include a thin LCP film (e.g., the birefringent medium layer 311, 370, 383, or 393, or a combination thereof) in accordance with an embodiment of the present disclosure.

Figure 4D:
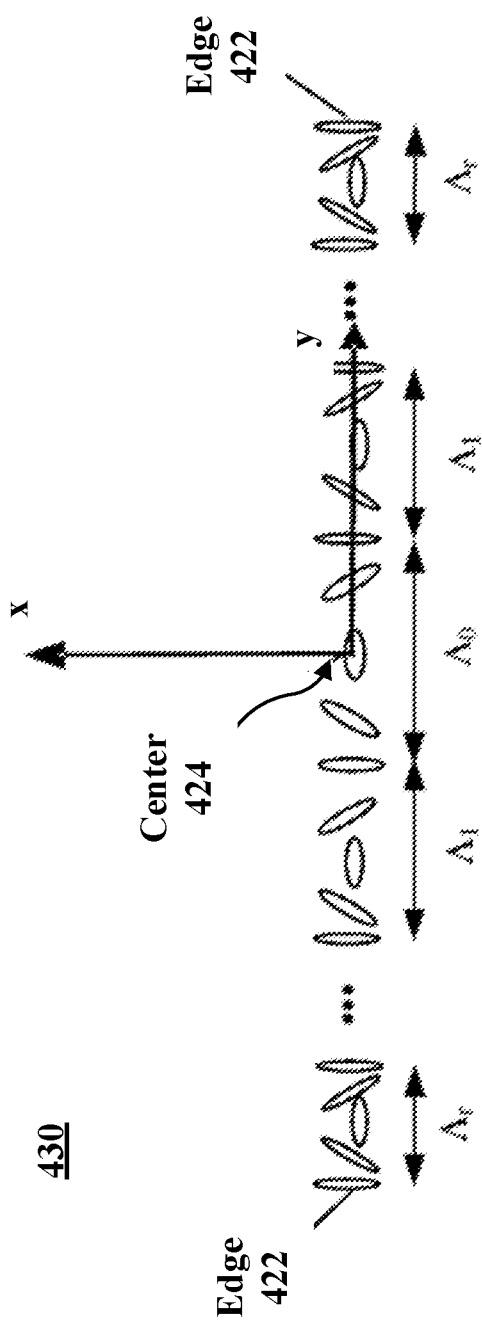
FIG. 4D schematically illustrates a diagram of a portion of RM orientations in the PBP lens in FIG. 4C, according to an embodiment of the present disclosure.

FIG. 4D shows a section of an RM alignment 430 taken along the y-axis in the PBP lens 400 shown in FIG. 4C. As shown in FIG. 4D, the continuous in-plane rotation of the orientations of the RMs may accelerate by moving toward the edge 422 from the center 424 of the PBP lens 400, such that the period of the obtained periodic structure (e.g., pitch) may decrease. An optical phase delay in the PBP lens 400 may occur due to the geometric phase associated with the continuous in-plane rotation of the orientations of the RMs, resulting in a lensing effect. For example, the pitch ($\Lambda_0$) at the lens center 424 may be the largest, and the pitch ($\Lambda_r$) at the edge 422 may be the smallest, i.e., $\Lambda_0 > \Lambda_1 > \ldots > \Lambda_r$. In the x-y plane, for a PBP lens with a lens radius (r) and a lens focus (+/−f), the azimuth angle θ may satisfy $\theta = \pi r^2 / 2 f\lambda$, where λ is the wavelength of an incident light.

The PBP lens 400 shown in FIG. 4C may be a passive PBP lens that has two discrete optical states: a focusing state and a defocusing state. The state of a passive PBP lens may depend on the handedness of polarization of the light incident on the passive PBP lens and the handedness of the RM directors' rotation in the PBP lens 400. In some embodiments, the passive PBP lens may operate in a defocusing state in response to an incident light with a left-handed polarization, and operate in a focusing state in response to an incident light with a right-handed polarization. In some embodiments, the passive PBP lens may operate in a defocusing state in response to an incident light with a right-handed polarization, and operate in a focusing state in response to an incident light with a left-handed polarization. The focusing state may add an optical power to the system (i.e., has a positive focus of 'f') and the defocusing state may subtract an optical power from the system (i.e., has a negative focus of '−f').

In some embodiments, the passive PBP lens may be switchable between the focusing state and defocusing state when the polarization (e.g., handedness) of the incident light is switched by another optical device. For example, an active polarization switch may be coupled to the passive PBP lens. The passive PBP lens may receive a light output from the active polarization switch. The active polarization switch may control (e.g., switch) the polarization of the light incident onto the passive PBP lens. The active polarization switch may convert the polarization of the incident light from a first polarization direction (e.g., a first handedness) to a second polariton polarization direction (e.g., a second handedness) different from (e.g., opposite to) the first polarization direction, or may maintain the polarization of the incident light, in accordance with an operating state (e.g., a switching state or a non-switching state) of the active polarization switch. In some embodiments, the active polarization switch may include a switchable half-wave plate ("SHWP"). The switching speed of the active polarization switch may determine the switching speed of the passive PBP lens.

Figure 4E:
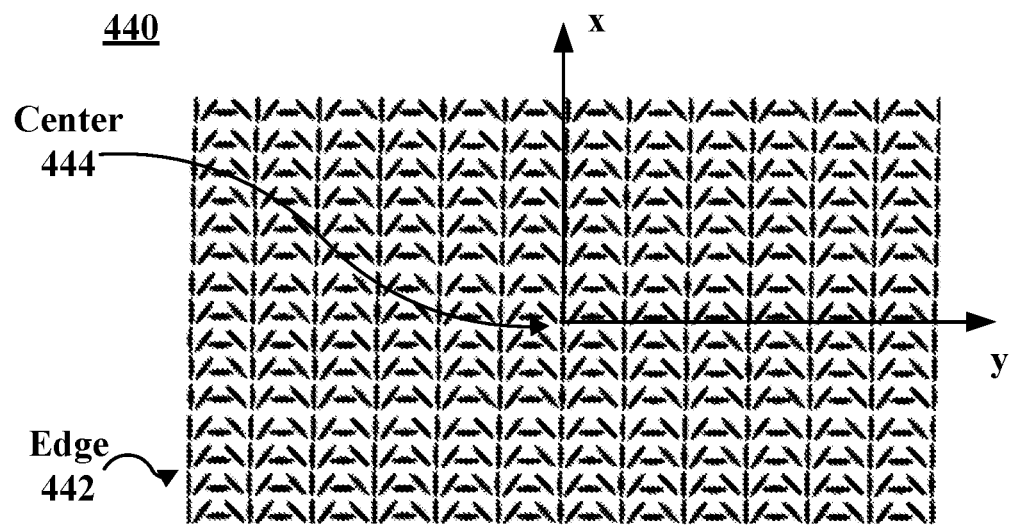
FIG. 4E schematically illustrates a cross-sectional view of RM orientations when the LC optical element in FIG. 4A functions as a PBP grating, according to an embodiment of the present disclosure.
Figure 4F:
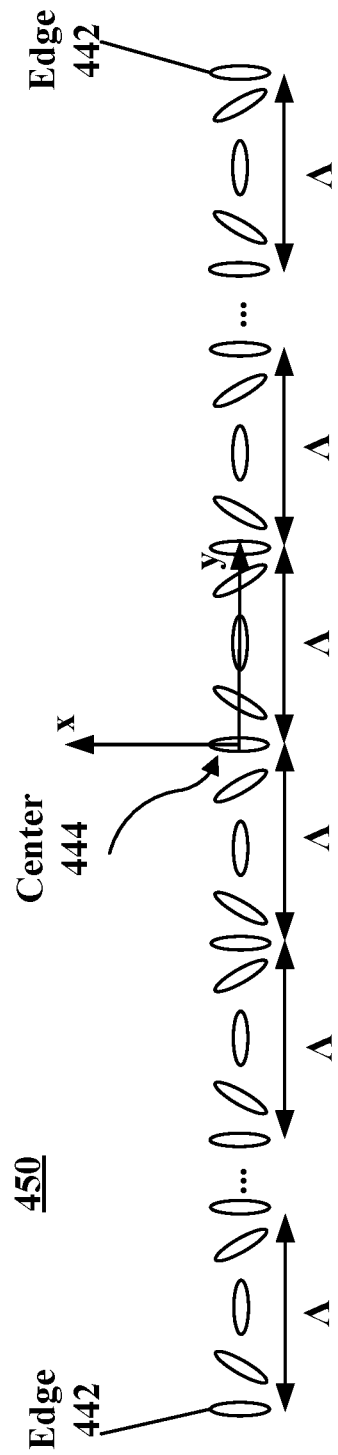
FIG. 4F schematically illustrates a diagram of a portion of RM orientations in the PBP grating in FIG. 4E, according to an embodiment of the present disclosure.

FIG. 4E illustrates an x-y cross-sectional view of an alignment pattern 440 when the thin-film LC optical device 400 shown in FIG. 4A functions as a PBP grating or deflector 400. FIG. 4F shows schematically illustrates a diagram of a portion of an RM alignment 450 taken along the y-axis in the PBP grating 400 shown in FIG. 4E. As shown in FIGS. 4E and 4F, in the PBP grating 400, the in-plane orientation (e.g., azimuth angles) of the RMs may vary in a linearly repetitive pattern from a center 444 to an edge 442 of the PBP grating 400, with a uniform pitch Λ. The pitch Λ of the PBP grating 400 may be half of the distance along the y-axis between repeated portions of the pattern. The pitch Λ may determine, in part, the optical properties of PBP grating 400. For example, a circularly polarized light incident along the optical axis (e.g., z-axis) of the PBP grating 400 may have a grating output including primary, conjugate, and leakage light respectively corresponding to diffraction orders m=+1, −1, and 0. The pitch Λ may determine the diffraction angles (e.g., beam-steering angles) of the light in the different diffraction orders. Generally, the smaller the pitch Λ, the larger the diffraction angle for a given wavelength of light.

The PBP grating 400 shown in FIG. 4E may be a passive PBP grating that has two optical states, similar to those of a passive PBP lens: a positive state and a negative state. In some embodiments, in the positive state and the negative state, the PBP grating 400 may diffract an incident light at a specific wavelength to a positive angle (e.g., +θ) and a negative angle (e.g., −θ), respectively. In addition, the PBP grating 400 may output a light that has a handedness opposite to the handedness of the incident light. The optical state of the PBP grating 400 may depend on a handedness of a circularly polarized incident light. In some embodiments, the PBP grating 400 may operate in a positive state in response to a right-handed circularly polarized light, and may operate in a negative state in response to a left-handed circularly polarized light. In some embodiments, the PBP grating 400 may operate in a positive state in response to a left-handed circularly polarized light, and may operate in a negative state in response to a right-handed circularly polarized light.

The PBP grating 400 may be switchable between the positive state and negative state when the handedness of the incident light is switched by another optical device (e.g., an active polarization switch). For example, the active polarization switch may be coupled to the PBP grating 400. The PBP grating 400 may receive a light output from the active polarization switch. The polarization switch may control (e.g., switch) the polarization of the light incident onto the PBP grating 400. The polarization switch may convert the polarization of the incident light from a first polarization direction (e.g., a first handedness) to a second polariton polarization direction (e.g., a second handedness) different from (e.g., opposite to) the first polarization direction, or may maintain the polarization of the incident light, in accordance with an operating state (e.g., a switching state or a non-switching state) of the active polarization switch. In some embodiments, the polarization switch may include an SHWP. The switching speed of the polarization switch may determine the switching speed of the PBP grating 400.

Figure 5A:
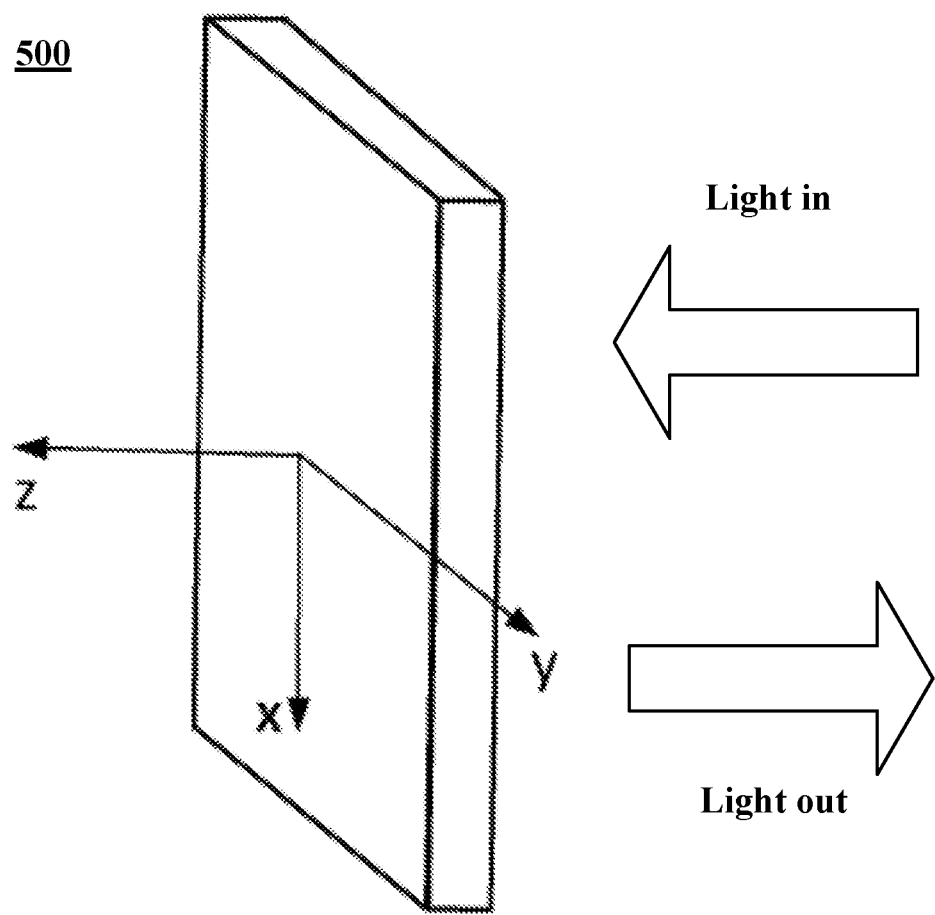
FIG. 5A schematically illustrates a diagram of a reflective-type achromatic thin-film LC optical element, according to an embodiment of the present disclosure.
Figure 5B:
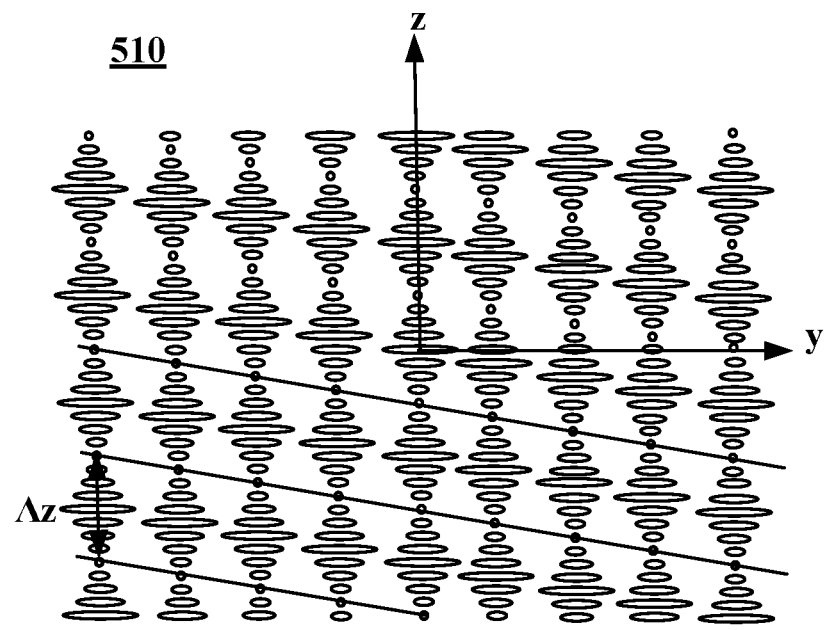
FIG. 5B schematically illustrates a cross-sectional view of RM orientations when the LC optical element in FIG. 5A functions as a reflective PBP grating, according to an embodiment of the present disclosure.

In addition to the transmissive thin-film LC optical elements or devices shown in FIGS. 4A-4F, reflective thin-film LC optical devices may also be realized. FIG. 5A illustrates a schematic diagram of a reflective-type achromatic thin-film LC optical element or device 500, according to an embodiment of the present disclosure. FIG. 5B illustrates a y-z cross-sectional view of an RM alignment 510 when the LC optical device 500 shown in FIG. 5 functions as a reflective PBP grating, according to an embodiment of the present disclosure. The reflective PBP grating, due to its physical properties, may also be referred to as a reflective polarization volume grating ("RPVG"). As shown in FIG. 5B, the RPVG 500 may incorporate a substantially high degree of twist along a z-direction (e.g., the RMs in the RPVG 500 may have a helical structure). Different from the transmissive PBP grating shown in FIG. 4E that diffracts an incident light via modulating the phase of the incident light, the RPVG 500 may diffract an incident light through Bragg reflection (or slanted multiplayer reflection). The RPVG 500 may primarily diffract a circularly polarized light having a handedness that is the same as the handedness of the helical structure of the RPVG 500, and primarily transmit a light having other polarizations without changing the polarization of the transmitted light. For example, when a circularly polarized incident light has a handedness that is opposite to the handedness of the helical structure of the RPVG 500, the incident light may be primarily transmitted to the 0-th order and the polarization may be substantially retained (e.g., unaffected). The diffraction efficiency of the RPVG 500 may be a function of the film thickness (e.g., the thickness of the birefringent medium layer included in the RPVG 500 alone the z-direction). For example, the diffraction efficiency of the RPVG 500 may increase monotonically with the thickness and then gradually saturate (e.g., remain substantially constant).

The achromatic thin-film LC optical elements or devices based on RMs with positive birefringence dispersion property and negative birefringence dispersion property are for illustrative purposes. Achromatic thin-film LC optical elements or devices may also be configured based on suitable birefringent materials (e.g., active LCs, passive LCs, a combination of active LCs and passive LCs) with positive birefringence dispersion property and negative birefringence dispersion property, following the same design principles for the achromatic thin-film LC optical elements or devices based on RMs with positive birefringence dispersion property and negative birefringence dispersion property. In some embodiments, when the achromatic thin-film LC optical element includes active LCs or a combination of active LCs and passive LCs, the achromatic thin-film LC optical element may function as an active achromatic thin-film LC optical element, which may be switchable by an external field, e.g., an external electric field. For example, when the active achromatic thin-film LC optical element has a structure similar to that shown in FIGS. 4A-5B, the active achromatic thin-film LC optical element may function as an active PBP optical element. For example, the active achromatic thin-film LC optical element functioning as an active PBP grating may be switchable between a positive/negative state and a neutral state via an external field applied to the LCs. In the neutral state, the active PBP grating may not diffract an input light, and may or may not affect the polarization of the light transmitted through the active PBP grating. In some embodiments, the active PBP grating may be switchable to the neutral state via an external electric field applied to the LCs.

Similarly, the active achromatic thin-film LC optical device functioning as an active PBP lens may be switchable between a focusing/defocusing state and a neutral state via an external field applied to the LCs. In the neutral state, the active PBP lens may not focus/defocus an input light, and may or may not affect the polarization of the light transmitted through the active PBP lens. In some embodiments, the active PBP lens may be switchable to the neutral state via an external electric field applied to the LCs.

The achromatic thin-film LC optical elements or devices in accordance with embodiments of the present disclosure may be implemented in a variety of fields. Such implementations are within the scope of the present disclosure. In some embodiments, the disclosed achromatic thin-film LC optical elements or devices may be implemented as multi-functional optical components in near-eye displays ("NEDs") for augmented reality ("AR"), virtual reality ("VR"), and/or mixed reality ("MR"). For example, the disclosed achromatic thin-film LC optical elements or devices may be implemented as eye-tracking components, accommodation components for realizing multiple focuses or a variable focus, display resolution enhancement components, pupil steering elements, and a broadband waveplate (e.g., a quarter-wave plate or a half-wave plate), etc., which may significantly reduce the weight and enhance the optical performance of the NEDs. As a result, the disclosed achromatic thin-film LC optical elements or devices may be implemented in futuristic smart glasses.

Figure 6A:
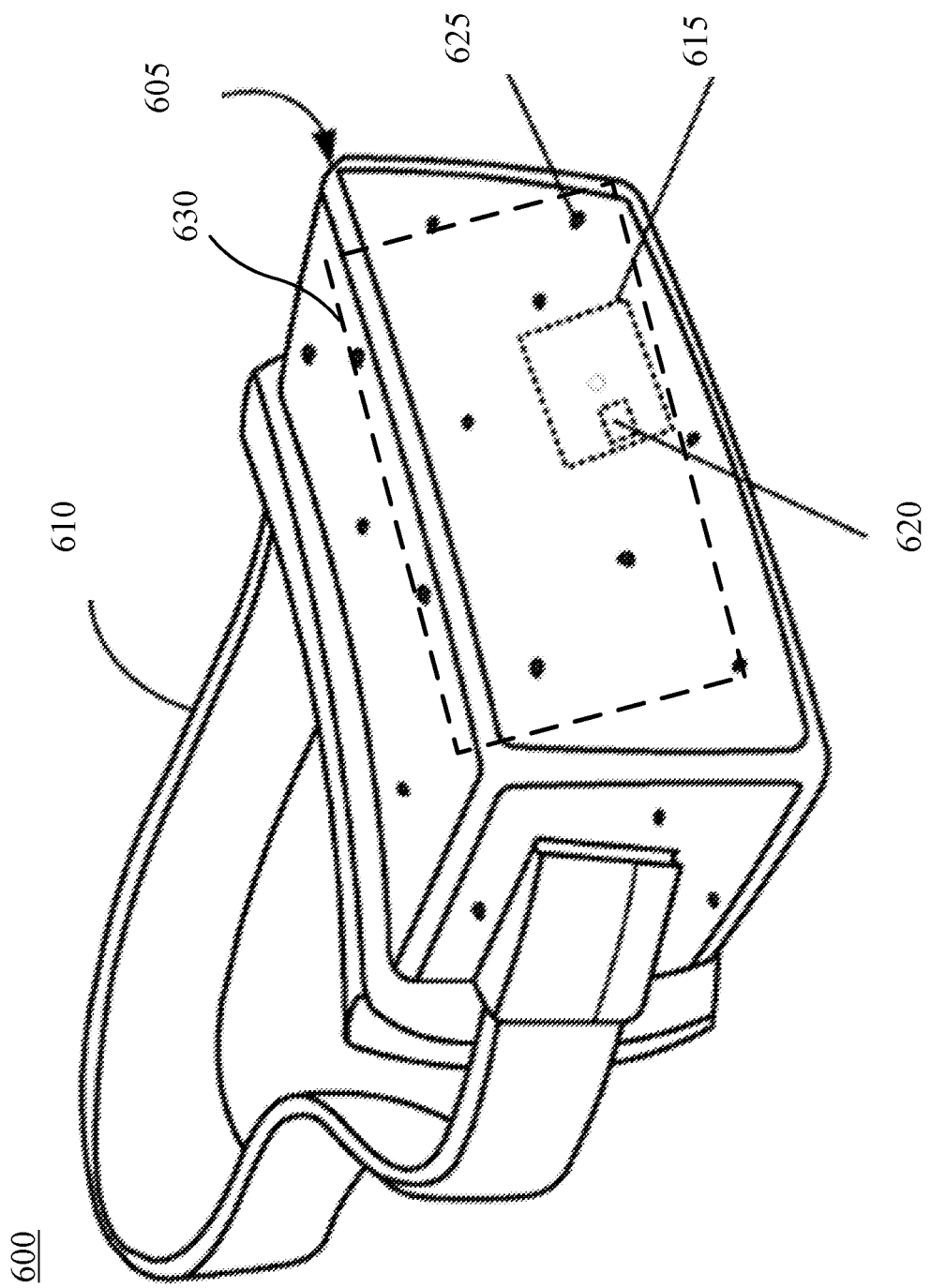
FIG. 6A schematically illustrates a diagram of a near-eye display ("NED"), according to an embodiment of the present disclosure.
Figure 6B:
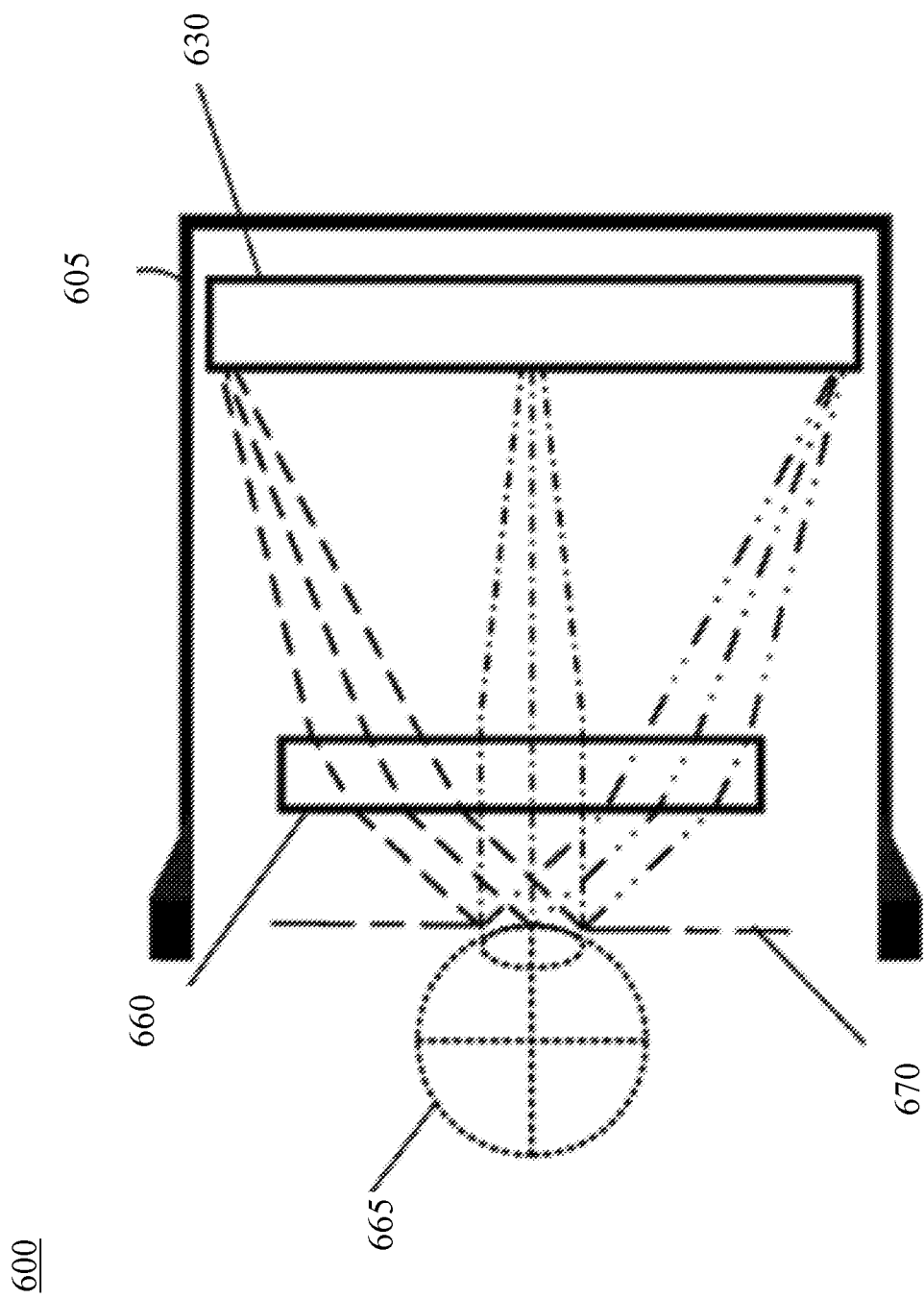
FIG. 6B schematically illustrates a cross-sectional view of a front body of the NED in FIG. 6A, according to an embodiment of the present disclosure.

FIG. 6A illustrates a diagram of a near-eye display ("NED") 600 according to an embodiment of the present disclosure. FIG. 6B illustrates a cross-sectional view of a front body of the NED 600 shown in FIG. 6A according to an embodiment of the present disclosure. The NED 600 may include one or more of the disclosed achromatic thin-film LC optical elements or devices, such as the achromatic thin-film LC optical device 300, 350, 380, or 390.

As shown in FIG. 6A, an embodiment of the NED 600 may be a head-mounted display. The NED 600 may include a front body 605 and a band 610. The band 610 may be configured for securing the front body 605 to a head of a user. The front body 605 may include one or more electronic display elements of an electronic display 630, an inertial measurement unit ("IMU") 615, one or more position sensors 620, and one or more locators 625. The front body 605 may include other elements. In some embodiments, one or more elements shown in FIG. 6A may be omitted. In the embodiment shown in FIG. 6A, the position sensors 620 may be located within the IMU 615, and neither the IMU 615 nor the position sensors 620 may be visible to the user. In some embodiments, the IMU 615, the position sensors 620, and the locators 625 may be integrated as a single device and may be configured to provide attitude and/or positional information of the NED 600. The NED 600 may function as or be included in a VR, AR, or MR device. When the NED 600 functions as or be included in an AR or MR device, portions of the NED 600 and its internal components may be at least partially transparent.

As shown in FIG. 6B, the front body 605 may include the electronic display 630 and a varifocal block 660 that together provide an image light to an exit pupil 670. The exit pupil 670 may refer to a location of the front body 605 where a user's eye 665 is positioned. For the purposes of illustration, FIG. 6B shows a cross-sectional view of the NED 600 associated with a single eye 665. It is understood that the NED 600 may include another varifocal block separate from the varifocal block 660, to provide an altered image light to another eye of the user. Additionally, the NED 600 may include an eye tracking system (not shown). The eye tracking system may include, e.g., one or more light sources configured to illuminate one or both eyes of the user, and one or more cameras configured to capture images of one or both eyes of the user based on the light emitted by the light sources and reflected by the one or both eyes.

The electronic display 630 may display images to the user. In some embodiments, the electronic display 630 may include a waveguide display or a stacked waveguide display for each eye 665 of the user. For example, the stacked waveguide display may be a polychromatic display (e.g., a red-green-blue ("RGB") display) including a stack of waveguide displays, the respective monochromatic light sources of which are configured to emit lights of different colors. The waveguide display may include a light source assembly configured to generate an image light and an output waveguide configured to output an expanded image light to the eye 665 of the user. The output waveguide may include one or more coupling elements configured to couple a light from the light source assembly into the output waveguide, one or more decoupling elements configured to decouple the light from the output waveguide to the eye 665 of the user, and one or more directing elements configured to direct the light output by the one or more coupling elements to the one or more decoupling elements.

In existing NEDs based on conventional technologies, the coupling element, the directing element, and the decoupling element may be, for example, a diffraction grating, a holographic grating, one or more cascaded reflectors, one or more prismatic surface elements, and/or an array of holographic reflectors. In contrast, in the disclosed embodiments, the coupling element, the directing element, and the decoupling element may be realized by the disclosed achromatic thin-film LC optical devices with a corresponding structured RM alignment pattern, such as the PBP gratings shown in FIGS. 4E and 4F and FIGS. 5A and 5B. Compared to various gratings used in conventional NEDs, such as surface-relief gratings ("SRGs") and holographic gratings ("HGs"), the disclosed achromatic thin-film LC optical device functioning as the PBP grating has a high efficiency over a large field of view and a broad wavelength spectrum (e.g., the band of visible wavelengths), and provides great advantages for waveguide-coupling NEDs used for VR, AR, or MR applications. Further, because the RPVG shown in FIGS. 5A-5B allows for deflection of a circularly polarized light having a specified polarization, and transmission therethrough of other lights having other polarizations, when the RPVG is used as a combiner that combines the displayed images and the real world light in NEDs for AR applications, the overall transmittance of the real-world light may be increased.

Further, the varifocal block 660 shown in FIG. 6B may be configured to adjust a distance of a light emitted from the electronic display 630, such that the light appears at predetermined focal distances from the eye(s) of the user. The varifocal block 660 may include one or more varifocal structures arranged in an optical series. A varifocal structure is an optical device configured to dynamically adjust its focus in accordance with instructions from a controller. The varifocal structure may include one or more single-focus lenses having a fixed optical power and/or one or more variable-focus lenses having an adjustable (or variable) optical power. The one or more variable-focus lenses may be realized by the disclosed achromatic thin-film LC optical devices with a corresponding structured RM alignment pattern, such as the PBP lens shown in FIG. 4C.

Design specifications for NEDs used for VR, AR, or MR applications typically include a large range of optical power to adapt for human eye vergence-accommodation (e.g., about ±2 Diopters or more), fast switching speeds (e.g., with a switching time of less than or equal to about 300 ms), and good image quality. Conventional LC lenses may not be suitable for these applications, because a conventional LC lens generally uses LC materials having a relatively high refractive index or a relatively large thickness (which reduces the switching speeds). In contrast, the thin-film LC optical element functioning as a PBP lens, as disclosed herein, may be configured to meet design specifications using RM materials having a relatively low refractive index. Moreover, the thin-film LC optical element functioning as a PBP lens is broadband, thin (e.g., a single birefringent medium layer 370 shown in FIG. 3B may be as thin as about 2 μm), and has high switching speeds (e.g., with a switching time of less than or equal to 300 ms).

In addition, in some embodiments, the varifocal block 660 may be configured to magnify a received light, correct optical errors associated with the image light, and/or present the corrected image light to a user of the NED 600. The varifocal block 660 may additionally include one or more optical elements arranged in an optical series, such as one or more of an aperture, a Fresnel lens, a convex lens, a concave lens, a filter, or any other suitable optical element that may affect image light. The one or more optical elements may also be realized by the disclosed thin-film LC optical devices with a corresponding in-plane alignment pattern of RMs.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described.

Embodiments of the disclosure may also relate to an apparatus for performing the operations herein. This apparatus may be specially constructed for specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical device, comprising:
a first layer including a first birefringent material having a negative birefringence dispersion property; and
a second layer including a second birefringent material having a positive birefringence dispersion property,
wherein the negative birefringence dispersion property indicates that a first birefringence of the first birefringent material increases as a wavelength of a light increases, and the positive birefringence dispersion property indicates that a second birefringence of the second birefringent material decreases as the wavelength of the light increases, and
wherein the first birefringence and the second birefringence have the same sign.

2. The optical device of claim 1, wherein a sum of a first product between a first thickness and the first birefringence of the first layer and a second product between a second thickness and the second birefringence of the second layer, is substantially proportional to the wavelength of the light within a predetermined wavelength range.

3. The optical device of claim 1, wherein at least one of the first layer or the second layer includes a liquid crystal polymer film.

4. The optical device of claim 3, wherein the first birefringent material includes polymerized reactive mesogens ("RMs") having the negative birefringence dispersion property, and the second birefringent material includes polymerized RMs having the positive birefringence dispersion property.

5. The optical device of claim 4, wherein:
a structured pattern of the first layer includes the polymerized RMs having the negative birefringence dispersion property aligned in a first in-plane alignment pattern, and
a structured pattern of the second layer includes the polymerized RMs having the positive birefringence dispersion property aligned in a second in-plane alignment pattern.

6. The optical device of claim 1, further comprising a substrate coupled to the first layer.

7. The optical device of claim 6, further comprising an alignment structure disposed between the substrate and the first layer, and configured to define a structured pattern for at least one of the first layer or the second layer.

8. The optical device of claim 1, wherein the optical device includes a passive or an active optical device.

9. An optical device, comprising:
a substrate; and
a birefringent medium layer coupled to the substrate and including a combination of a first birefringent material having a negative birefringence dispersion property and a second birefringent material having a positive birefringence dispersion property,
wherein the negative birefringence dispersion property indicates that a first birefringence of the first birefringent material increases as a wavelength of a light increases, and the positive birefringence dispersion property indicates that a second birefringence of the second birefringent material decreases as the wavelength of the light increases, and
wherein the first birefringence and the second birefringence have the same sign.

10. The optical device of claim 9, wherein concentrations of the first birefringent material and the second birefringent material are configured to provide a total phase retardation of the birefringent medium layer that is substantially constant with respect to a predetermined wavelength range.

11. The optical device of claim 9, wherein the birefringent medium layer includes a liquid crystal polymer film.

12. The optical device of claim 9, wherein the first birefringent material includes polymerized reactive mesogens ("RMs") having the negative birefringence dispersion property, and the second birefringent material includes polymerized RMs having the positive birefringence dispersion property.

13. The optical device of claim 12, wherein a structured pattern of the birefringent medium layer includes the polymerized RMs having the negative birefringence dispersion property and the polymerized RMs having the positive birefringence dispersion property mixed and aligned in a predetermined in-plane alignment pattern.

14. The optical device of claim 9, further comprising an alignment structure disposed between the substrate and the birefringent medium layer, and configured to at least partially define a structured pattern of the birefringent medium layer.

15. An optical film, comprising:
a birefringent medium layer including a mixture of a first liquid crystal material having a negative birefringence dispersion property and a second liquid crystal material having a positive birefringence dispersion property,
wherein the negative birefringence dispersion property indicates that a first birefringence of the first liquid crystal material increases as a wavelength of a light increases, and the positive birefringence dispersion property indicates that a second birefringence of the second liquid crystal material decreases as the wavelength of the light increases, and wherein the first birefringence and the second birefringence have the same sign.

16. The optical film of claim 15, wherein the birefringent medium layer includes a liquid crystal polymer film.

17. The optical film of claim 15, wherein the first liquid crystal material includes polymerized reactive mesogens ("RMs") having the negative birefringence dispersion property, and the second liquid crystal material includes polymerized RMs having the positive birefringence dispersion property.

18. The optical film of claim 17, wherein a structured pattern of the birefringent medium layer includes the polymerized RMs having the negative birefringence dispersion property and the polymerized RMs having the positive birefringence dispersion property mixed and aligned in a predetermined in-plane alignment pattern.

19. The optical device of claim 1, wherein the first birefringence and the second birefringence are positive birefringences.

20. The optical device of claim 9, wherein the first birefringence and the second birefringence are positive birefringences.

* * * * *